US011356380B1

(12) United States Patent
White et al.

(10) Patent No.: US 11,356,380 B1
(45) Date of Patent: *Jun. 7, 2022

(54) SYSTEMS AND METHODS FOR QUEUE PROTECTION

(71) Applicant: CABLE TELEVISION LABORATORIES, INC., Louisville, CO (US)

(72) Inventors: Gregory Charles White, Louisville, CO (US); Steve Glennon, Lafayette, CO (US); Karthik Sundaresan, Boulder, CO (US); Luis Alberto Campos, Superior, CO (US); Robert J. Briscoe, Woodbridge (GB)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/195,192

(22) Filed: Mar. 8, 2021

Related U.S. Application Data

(63) Continuation of application No. 16/660,620, filed on Oct. 22, 2019, now Pat. No. 10,944,684, which is a continuation-in-part of application No. 15/987,836, filed on May 23, 2018, now Pat. No. 10,523,577.

(60) Provisional application No. 62/509,887, filed on May 23, 2017, provisional application No. 62/748,914, filed on Oct. 22, 2018.

(51) Int. Cl.
| | |
|---|---|
| *H04L 47/6275* | (2022.01) |
| *H04L 47/28* | (2022.01) |
| *H04L 47/625* | (2022.01) |
| *H04L 47/2441* | (2022.01) |

(52) U.S. Cl.
CPC ...... *H04L 47/6275* (2013.01); *H04L 47/2441* (2013.01); *H04L 47/28* (2013.01); *H04L 47/626* (2013.01)

(58) Field of Classification Search
CPC ........... H04B 3/32; H04B 3/487; H04L 47/76; H04L 5/0039; H04L 12/2801; H04L 47/11; H04L 47/2441; H04L 47/58
See application file for complete search history.

(56) References Cited

U.S. PATENT DOCUMENTS

| | | | | |
|---|---|---|---|---|
| 7,613,167 | B2 * | 11/2009 | Denney | H04L 12/2801 370/328 |
| 8,489,137 | B1 * | 7/2013 | Mistry | H04J 11/003 455/522 |
| 2001/0030974 | A1 * | 10/2001 | Pauwels | H04L 49/205 370/444 |

(Continued)

*Primary Examiner* — Khanh C Tran
(74) *Attorney, Agent, or Firm* — Armstrong Teasdale LLP

(57) ABSTRACT

A scheduling device for managing a packet queue of a communication gateway includes a receiving portion configured to receive data packets according to at least one communication protocol, a processor, and classification module configured to separate the received data packets into a first traffic queue and a second traffic queue separate from the first traffic queue. The first traffic queue includes a low latency service flow classified to have strict priority. The second traffic queue includes a primary service flow classified as having a classic priority. The classification module separates the received data packets so that those with a first indicator are sent to the first traffic queue and those without the first indicator are sent to the second traffic queue.

22 Claims, 18 Drawing Sheets

(56) References Cited

U.S. PATENT DOCUMENTS

| | | | |
|---|---|---|---|
| 2008/0144496 A1* | 6/2008 | Bachmutsky | H04L 47/10 370/230.1 |
| 2008/0304413 A1* | 12/2008 | Briscoe | H04L 69/161 370/235 |
| 2009/0190470 A1* | 7/2009 | Hinosugi | H04L 47/522 370/230.1 |
| 2012/0014282 A1* | 1/2012 | Pappu | H04L 47/2441 370/253 |
| 2016/0197764 A1* | 7/2016 | Salinger | H04L 12/2801 370/401 |

* cited by examiner

SYSTEMS AND METHODS FOR QUEUE PROTECTION

RELATED APPLICATIONS

This application is a continuation of U.S. patent application Ser. No. 16/660,620, filed on Oct. 22, 2019. U.S. patent application Ser. No. 16/660,620 is a continuation in part of U.S. patent application Ser. No. 15/987,836, filed May 23, 2018, now U.S. Pat. No. 10,523,577, issued on Dec. 21, 2019. U.S. patent application Ser. No. 15/987,836 claims the benefit of and priority to U.S. Provisional Patent Application Ser. No. 62/509,887, filed May 23, 2017. U.S. patent application Ser. No. 16/660,620 claims the benefit and priority to U.S. Provisional Patent Application Ser. No. 62/748,914, filed Oct. 22, 2018. All of these prior applications are incorporated herein by reference in their entireties.

FIELD

This disclosure relates in general to the field of communications and, more particularly, techniques for managing flow over wireless access and wireline networks.

BACKGROUND

Today's communication systems may include separate wireless and wireline portions, each of which may be owned and controlled by the same or different operators. Present cable network operators, such as Multiple System Operators ("MSOs"), use Data Over Cable Service Interface Specification ("DOCSIS") networks for backhauling Internet traffic, but separate networks, including mobile networks, other DOCSIS networks, Wi-Fi networks, and radio networks have limited to no visibility into parts of the other network types. Each network type, whether DOCSIS or LTE, etc., may have separate traffic scheduling algorithms, and may experience higher latency due to internetwork visibility and communication.

FIG. 1 is a schematic illustration of a conventional upstream DOCSIS network 100. In the upstream direction, network 100 includes a Wi-Fi device 102, which communicates with a gateway 104 over a wireless communication pathway 106. Conventionally, wireless communication pathway 106 may be an 802.11ac wireless communication protocol. Gateway 104 may include, for example, a cable modem (CM) 108, or alternatively, gateway 104 is coupled with a CM 108.

Gateway 104 communicates with a cable modem termination system (CMTS) 110 over connection 112 using a DOCSIS 3.1 protocol. Connection 112 may be, for example, a coaxial cable or a fiber-optic link. CMTS 110 sends the DOCSIS 3.1 upstream traffic to a cable network 114, which may include operable communication with the Internet and/or Cloud, as well as one or more applications for utilizing the upstream data.

In operation, DOCSIS network 100 will experience latency in the upstream traffic as a result of several factors. For example, queuing delays may result primarily from traditional transfer control protocol (TCP) flows that send traffic faster than the link rate of network 100. The upstream traffic will be sent until a packet drop occurs. In such instances, the upstream traffic may be paused to let the queue drain. Such occurrences create a bottleneck link that results in poor latency performance for other applications that are sharing the bottleneck link.

Some recent Active Queue Management (AQM) techniques have been proposed to improve the traffic flow over the network, such as Proportional Integral Controller Enhanced (PIE), Controlled Delay (CoDel), Fair/Flow Queueing+CoDel (the "fq_codel" variant), Bottleneck Bandwidth and Round trip time (BBR, a congestion avoidance algorithm), Low Latency Low Loss Scalable throughput (L4S), DualQ, TCP-Prague, congestion exposure (ConEx), Data Center TCP (DCTCP), and Accurate Explicit Congestion Notification (Accurate ECN). The DOCSIS specifications have accordingly been updated to adopt the results of these various techniques as the research therefrom becomes available, and thus the buffer control in DOCSIS version 3.0 (D3.0) has achieved an order of magnitude reduction in latency under load, and the AQM in DOCSIS version 3.1 (D3.1) is achieved another order of magnitude reduction in steady-state latency under load. However, these advances have not kept pace with the increases in traffic and speed over present communication networks.

ECN, for example, is an extension of TCP/IP. ECN allows a router to send congestion signals without dropping packets, namely, by marking packets instead of dropping them. TCP congestion controls are algorithms for controlling the sending rate of network devices, and to adjust the sending rate according to available bandwidth. DCTCP is a scalable congestion control that uses slow-start and fast-recovery/fast-retransmission. AQM thus generally refers to techniques for controlling the filling levels and delays of queues. PIE is considered to be a more complex AQM that implements present and past queuing delays to calculate drop probabilities. L4S implements separation, identification, and scalable congestion control, and DualQ AQM expands upon L4S by using an ECN Capable Transport (ECT) codepoint to classify incoming packets, and then separate traffic into two different queues. One of the DualQ queues is dedicated for L4S traffic, and the other queue is dedicated for "classic" traffic. The separate queues of the DualQ AQM are useful for some latency reduction. However, it is desirable to further reduce latency while enabling deterministic latency for latency-sensitive packets, and particularly with respect to upstream traffic congestion.

SUMMARY OF THE INVENTION

In an embodiment, a scheduling device for managing a packet queue of a communication gateway is provided. The scheduling device includes a receiving portion configured to receive data packets according to at least one communication protocol, a processor, and classification module configured to separate the received data packets into a first traffic queue and a second traffic queue separate from the first traffic queue. The first traffic queue includes a low latency service flow classified to have strict priority. The second traffic queue includes a primary service flow classified as having a classic priority.

In an embodiment, a method of scheduling incoming data traffic over a communication network by an electronic device of the communication network implementing at least one processor is provided. The method includes steps of classifying packets of the incoming data traffic as being one of latency-sensitive and latency-insensitive based on the presence of a first indicator, associating each packet with a flow of data, wherein each flow of data includes a flow classification indicator, reclassifying the packets based on the associated flow classification indicator, and separating the reclassified packets into a first traffic queue having strict priority and a second traffic queue having classic priority.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
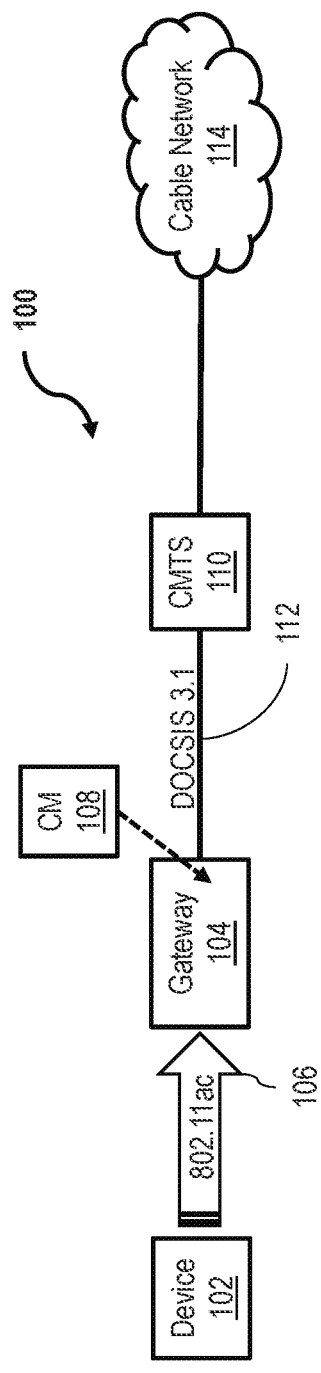
FIG. 1 is a schematic illustration of a conventional upstream DOCSIS network.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The systems and methods described below provide a multiple-component low latency DOCSIS AQM scheme that improves queuing and upstream scheduling in comparison with recent AQM techniques. In an exemplary embodiment, the present low latency DOCSIS techniques improve over existing queuing techniques by establishing at least two queues per service flow (SF), with the one of the two queues having strict priority queuing. This technique is different from the conventional DualQ AQM in that the present systems and methods may be configured to direct the low latency upstream traffic from the strict priority queue into a separate channel from the other queue, which may implement DualQ AQM according to conventional techniques, but still intermingle the primary (high-priority) and secondary ("classic" priority) service flows of the DualQ AQM along the same upstream channel, as described further below.

The present systems and methods thus extend the capabilities of techniques like DualQ AQM beyond what is conventionally practiced. As described herein, and illustrated in the accompanying figures, the low latency queuing improvements of the present embodiments further allow application-limited traffic (i.e., non-congesting traffic) to share the high priority queue of the DualQ service flow, even if the application-limited traffic originates from the strict priority queue. Such non-congesting traffic could include traffic that is not marked as ECT(1), but which is compatible with L4S traffic that is sent over the high-priority service flow of the other queue. In an exemplary embodiment, the present scheme implements a default behavior to map the Differentiated Services Code Point (DSCP) equal to "Expedited Forwarding" User Datagram Protocol (UDP) packets to the high priority queue. The present embodiments further enable configuration for other classified traffic, and protection and/or policing of the queue to enforce non-congestion.

In an exemplary embodiment, Bloom filter-based queue protection may be implemented. In this example, the high priority queue maintains a Bloom filter (bitmap) that is m-bits long: B. For packets entering the high priority queue, k hashes of the header tuple are calculated to create a Bloom filter value P. If (P==B & P), and for a bitwise AND, the packet is discarded. Otherwise, if B=P|B, for a bitwise OR to update Bloom filter. Accordingly, when the queue becomes empty, the Bloom filter is reset, namely, B=0. In some embodiments, this queue protection is implemented to enforce non-ECT(1) traffic. In other embodiments, this queue protection is implemented to enforce all traffic. According to the advantageous properties realized according to this exemplary embodiment, enforcement may be implemented for any flow to have at most one packet in the queue, while also discouraging aggregated high-priority service flow traffic from blocking the lower priority queue. In at least one embodiment, further protection is implemented to prevent the cues from being flooded by traffic having unique tuples, incrementing port numbers.

In an exemplary embodiment, the queuing techniques described herein further address the problems encountered with respect to existing DOCSIS Continuous Concatenation and Fragmentation (CCF). Specifically, with a DOCSIS CCF, when a low-priority packet head is transmitted, a newly arrived high-priority packet is required to wait until the low-priority packet tail completes transmission. According to this exemplary embodiment though, the low-priority packet tail and the high-priority packet may both be sent if the requisite space exists. Otherwise, this exemplary embodiment enables system configuration to discard the low-priority packet tail, and transmit the high-priority packet instead, without waiting. According to this embodiment, the CCF Segment Header syntax may also be modified to enable the insertion of high-priority packets immediately, by "pausing" the low-priority CCF session temporarily. In this instance, the high-priority packets may nevertheless be subject to CCF as well.

The present systems and methods are therefore of particular usefulness with respect to improving the scheduling of upstream traffic. The two separate queue components advantageously enable both spread granting, and predictive scheduling. The spread grant improvements are realized in consideration of the practice of that CMTS schedulers typically operate over a 2 ms MAP interval, and give each service flow at most one grant per MAP interval. This operation thus results in a nominal 2 ms period between grants on a given upstream channel. According to the improved techniques of this example though, low-latency service flows are enabled such that grants may be scheduled more frequently. At least one embodiment, these more frequent grants are spread "quasi-equally" across all orthogonal frequency-division multiple access (OFDMA) frames in the interval.

The predictive scheduling improvements of the present embodiments are realized through a novel configuration of the upstream scheduler. In an exemplary embodiment, for low latency service flows, instead of being configured to strictly respond to received requests, an upstream scheduler (see FIG. 3, below) is configured to track an estimate of the bandwidth demand of each (active) service flow, and then proactively schedule the bandwidth according to the estimated demand. In one example, the upstream scheduler is configured according to an algorithm that: (i) categorizes low latency service flows as one of active and inactive; (ii) for each low latency service flow categorized as active, estimates the current bandwidth demand (e.g., by an exponentially weighted moving average (EWMA)) to obtain a value BW_estimate; (iii) for each MAP interval, predictively schedules the bandwidth by multiplying BW_estimate by a given factor; and (iv) constrains the predicted bandwidth grant to be within predetermined boundaries (e.g., minimum and maximum values), or above/below a predetermined default threshold. According to this exemplary embodiment, if a cable modem (CM) has used all of the many slots granted, the algorithm may be further configured to add a request value to the predicted grant.

This disclosure describes an embodiment of a Queue Protection function as defined for DOCSIS (Data Over Cable Service Interface Specification). Queue Protection is part of a Low Latency feature proposed to be introduced into DOCSIS. The Queue Protection function itself is introduced and defined below. This disclosure describes support for Low Latency in DOCSIS and describes details of a number of features on which Queue Protection depends.

In the exemplary embodiment, Low Latency DOCSIS (LLD) tackles the two main causes of latency in the network: buffering delay and media access delay. Buffering delay is mainly caused by the current TCP protocol and its variants (e.g. Quick UDP Internet Connections (QUIC) and Bottleneck Bandwidth and Round-trip propagation time (BBR)). LLD addresses this by allowing the use of next-generation TCP protocols (which don't cause buffering delay) and by allowing non-TCP applications to avoid waiting behind the delays caused by current TCP. Media access delay, on the other hand, is a result of the shared-medium scheduling types currently provided by DOCSIS, which emphasize bandwidth efficiency over latency. LLD addresses media access delay by adding support for a predictive scheduler which, while somewhat less efficient, can provide extremely low latency service.

The high level goal for Low Latency DOCSIS is to enable lower-latency DOCSIS upstream and downstream forwarding with high DOCSIS bandwidth efficiency. Specifically, a key objective is to achieve a 99%-ile round trip time of 1 millisecond for packets traversing the DOCSIS network. Another objective is to reduce median latency for all traffic, while not impacting TCP bulk data throughput. Finally, it is intended that Low Latency DOCSIS features be available "out of the box" (i.e. with minimal operator configuration) as much as possible, while still making configuration parameters available so that the operator can control the service when necessary.

Figure 2A:
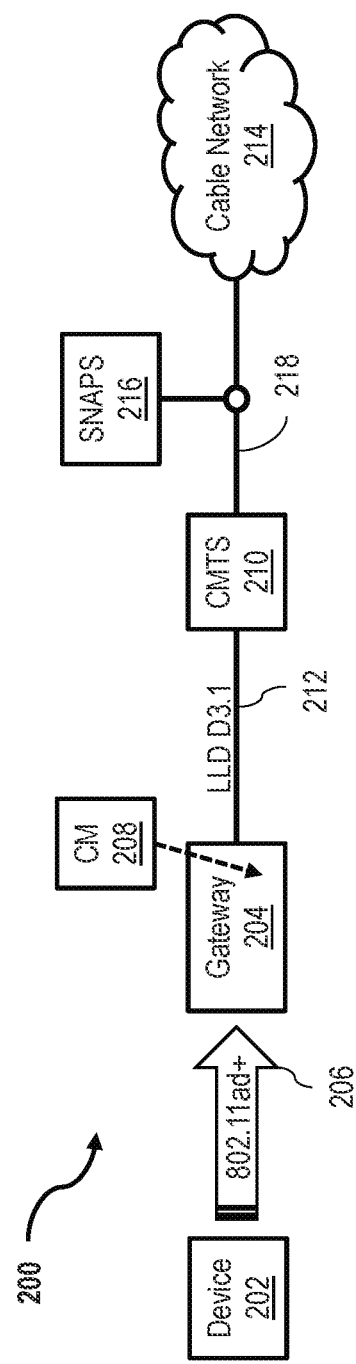
FIG. 2A is a schematic illustration of an exemplary upstream DOCSIS network for a wired gateway, according to an embodiment.

FIG. 2A is a schematic illustration of an exemplary upstream DOCSIS network 200 for a wired gateway. Network 200 is similar to conventional network 100, FIG. 1, except that network 200 implements the low latency DOCSIS techniques of the present systems and methods. As shown in the upstream direction, network 200 includes a Wi-Fi client device 202, which communicates with a gateway 204 over a wireless communication pathway 206. In the exemplary embodiment, wireless communication pathway 206 represents an 802.11ad+wireless communication protocol, and gateway 204 includes or is coupled with a CM 208. Gateway 204 communicates with a CMTS 210 over connection 212 using a DOCSIS 3.1 protocol. Connection 212 may be, for example, a coaxial cable or a fiber-optic link. CMTS 210 sends the DOCSIS 3.1 upstream traffic to a cable network 214, which may include operable communication with the Internet and/or Cloud, as well as one or more applications for utilizing the upstream data.

Network 200 further includes an application infrastructure 216 along an upstream communication link 218 to cable network 214. In the exemplary embodiment, application infrastructure 216 implements Software Defined Networking (SDN)/Network Functions Virtualization (NFV) Application Development Platform and OpenStack project (SNAPS). Implementation of SNAPS is particularly useful in association with the NFV infrastructure, as well as Virtualization Infrastructure Managers (VIM) that presently utilized DOCSIS and DOCSIS 3.1, and enables deployment of end-to-end applications. Network virtualization provides a software simulation of a hardware platform, and functionality is separated from the hardware to run as a "virtual instance." The network virtualization of system 200 thus further enables the capability to create, modify, move, and terminate functions across the network in a stable, repeatable, and cost-effective platform. Snaps further provides transparent application programming interfaces (APIs) for the various infrastructures, and reduces complexity of integration testing. In at least one embodiment, application infrastructure 216 utilizes a virtual Converged Cable Access Platform (CCAP) core to control the cable plant and move packets to and from client device 202 to the customer sites. This exemplary configuration is advantageous to achieve further low latency and backhaul optimization, while also realizing additional bandwidth savings and increased maximum frame size.

Figure 2B:
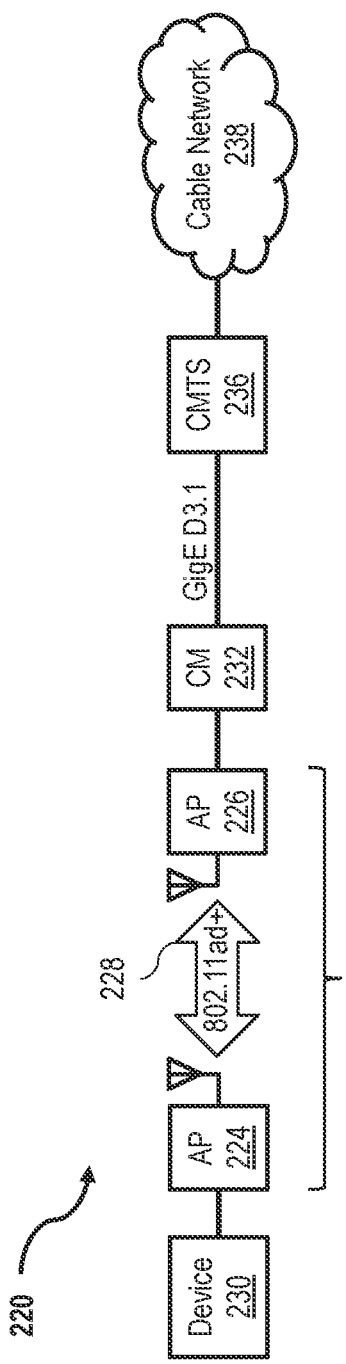
FIG. 2B is a schematic illustration of an exemplary upstream DOCSIS network for a wireless gateway, according to an embodiment.

FIG. 2B is a schematic illustration of an exemplary upstream DOCSIS network 220 for a wireless gateway. Network 220 is similar to network 200, FIG. 2A, except that network 220 illustrates a wireless communication gateway 222. In the exemplary embodiment, wireless communication gateway 222 includes at least one downstream access point (AP) 224 and at least one upstream AP 226. In this example, downstream AP 224 and upstream AP 226 communicate over a wireless communication pathway 228, which may utilized and 802.11ad+ communication protocol. Downstream AP 224 receives upstream data traffic from a client device 230, and sends the upstream data traffic to upstream AP 226, which is in operable communication with a CM 232. In an optional embodiment, CM 232 defaults to a TCP version in an ns-3 transport layer. CM 232 manages the upstream traffic according to the low latency techniques described herein, and sends the managed upstream traffic over a communication link 234 (e.g., cable, fiber, etc.) to a CMTS 236. In the optional embodiment, communication link 234 may be a Gigabit Ethernet connection, and CMTS 236 defaults to the same TCP version in the ns-3 transport layer as CM 232. CMTS 236 then transmits the managed upstream traffic to a cable network 238.

According to the embodiments described herein, a more realistic approach is provided to reduce latency for DOCSIS networks. Such additional latency reductions are achieved according to the implementation of an innovative upstream scheduler, as described below with respect to FIG. 3. In the exemplary embodiment, the upstream scheduler is implemented in, or in association with, CM 208, FIG. 2A, and/or CM 232, FIG. 2B. In other embodiments, the upstream scheduler may be implemented in, or in association with, CMTS 210 and/or CMTS 236, respectively.

Figure 3:
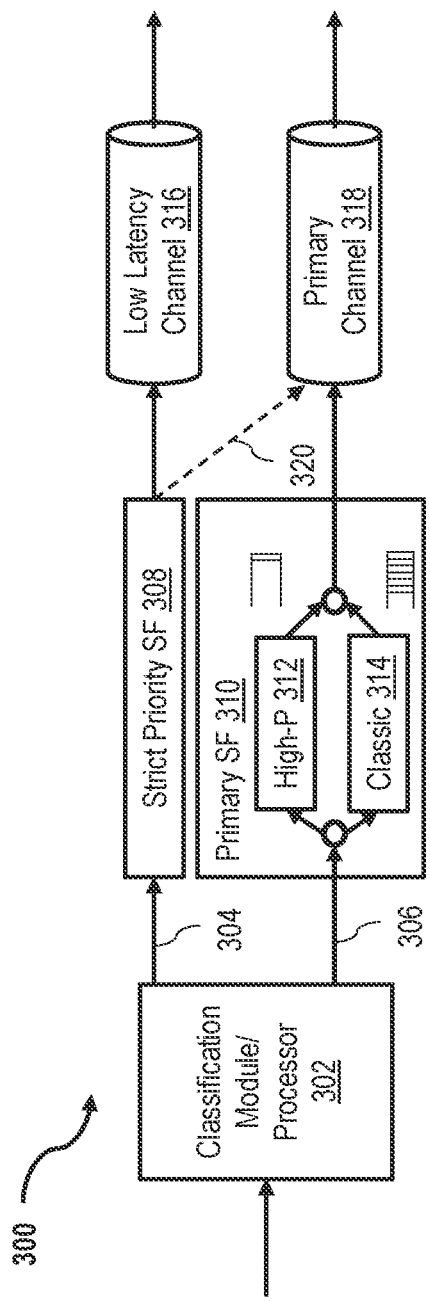
FIG. 3 depicts a schematic illustration of an exemplary upstream scheduler, according to an embodiment.

FIG. 3 depicts a schematic illustration of an exemplary upstream scheduler 300. In an exemplary embodiment, scheduler 300 is implemented within the operation of a CM, but may alternatively, or additionally, be implemented within the operation of a CMTS. Scheduler 300 includes a classification module 302 that is configured to track the received upstream traffic and classify service flows as being one of active and inactive. Classification module 302 is further configured to estimate a bandwidth demand for each active service flow and proactively schedule the bandwidth according to the estimated demand. In at least one embodiment, classification module 302 includes, or utilizes, a processor (not shown) to implement one or more algorithms according to the techniques described above.

In operation, classification module 302 separates the upstream traffic into a first traffic queue 304 and a second traffic queue 306. First traffic queue 304 is dedicated to sending a low latency service flow 308, and second traffic queue 306 is dedicated to sending a primary service flow 310. Low latency service flow 308 is classified by classification module 302 as having strict priority, whereas primary service flow 310 is classified by classification module 302 as having "classic" priority. In at least one embodiment, primary service flow 310 implements a DualQ AQM scheme, which further divides the classic priority into a first intermediate service sub-flow 312 having high-priority (e.g., L4S) and a second intermediate service sub-flow 314 having low (i.e., classic).

As can be seen from the example illustrated in FIG. 3, the high-priority first intermediate service sub-flow 312 is different from the strict priority low latency service flow 308. The strict priority low latency service flow 308, for example, is transmitted upstream on a separate low latency upstream channel 316, whereas both intermediate service sub-flows 312, 314 are managed such that the entirety of primary service flow 310 is transmitted by way of the same primary upstream channel 318. In an example of operation of scheduler 300, low latency upstream channel 316 sends one symbol per frame, and primary upstream channel 318 sends six symbols per frame.

In an optional embodiment, scheduler 300 is further configured to additionally separate from first traffic queue 304 and low latency service flow 308 any or all application-limited, non-congesting traffic, and send such non-congesting traffic along a redirect 320 in order to share high priority service flow 312 of primary service flow 310 (i.e., the DualQ service flow). In this optional embodiment, the non-congesting traffic may be pre-designated (e.g., by the traffic center, not shown) as traffic that is not marked as ECT(1), but which is compatible with the high-priority L4S traffic of first intermediate service sub-flow 312. According to this optional embodiment, the latency reduction benefits achieved according to conventional DualQ AQM techniques are further extended through the implementation of strict priority queuing, and without having to sacrifice any of the benefits presently achieved by DualQ AQM.

As also described above, upstream scheduler 300 further enables predictive scheduling by estimating the bandwidth demand, BW_estimate, of each active service flow, and then, in the exemplary embodiment, proactively schedules the bandwidth by multiplying BW_estimate by factor to obtain a predicted bandwidth grant. In some embodiments, the predicted bandwidth grant may be constrained within predetermined boundaries or upper/lower threshold limits, and a request value may be added to the predicted grant if all slots of the predicted grant have been used.

A proof of concept of the advantageous results described above and depicted in FIG. 3 has been obtained through a virtualized ideal scheduler simulation that assessed present DOCSIS system performance testing data (D3.0) and then performed virtualized testing for a D3.1 implementation that factored known CMTS constraints into the simulations. The virtualized simulations included both a Matlab simulation and an ns-3 simulation. The ns-3 simulation was implemented for circumstances able to (i) port existing D3.0 ns-2 implementation to ns-3, (ii) update implementation for D3.1 framing, and (iii) enhance to support multi-CM scenarios.

The embodiments described above are discussed with respect to a conventional cable network. Other embodiments that are contemplated herein utilize an optical network. Such an optical network may, for example, be formed with an Optical Network Terminal (ONT) or an Optical Line Termination (OLT), and an Optical Network Unit (ONU), and may utilize optical protocols such as EPON, RFOG, or GPON. Other embodiments that are contemplated include communication systems capable of x-hauling traffic, as well as satellite operator communication systems, Wi-Fi networks, MIMO communication systems, microwave communication systems, short and long haul coherent optic systems, etc. X-hauling is defined herein as any one of or a combination of front-hauling, backhauling, and mid-hauling. In these additional embodiments, the CMTS described above may be substituted with, or additionally include, a termination unit such as an ONT, an OLT, a Network Termination Unit, a Satellite Termination Unit, and other termination systems collectively referred to as "Modem Termination Systems (MTS)". Similarly, the CM described above may be substituted with, or additionally include, a satellite modem, an Optical Network Unit (ONU), a DSL unit, etc., which are collectively referred to as "modems." Furthermore, the DOCSIS protocol may be substituted with, or further include protocols such as EPON, RFoG, GPON, Satellite Internet Protocol, without departing from the scope of the embodiments herein.

Additionally, although the embodiments herein are described primarily with respect to upstream traffic, scheduler 300 may also be similarly implemented for downstream traffic, and therefore may be located within the operation of the CMTS in an exemplary embodiment. Although upstream traffic often includes different considerations than would the downstream traffic (e.g., upstream traffic is often considered more "bursty"), downstream traffic nevertheless also experiences latency problems, which will be improved according to the present techniques.

In further exemplary operation, scheduler 300 is configured with respect to MAP Intervals less than 2 ms. The algorithms described above thus further advantageous in that they may be easily adjusted in the virtual environment to optimize benefits and tradeoffs (e.g., between efficiency and latency) of the respective parameters. Through implementation of scheduler 300, low latency upstream channel 316 we can be managed to enforce sending of only single-symbol codewords, that is, no codewords are sent that traverse multiple symbols. In the exemplary embodiment, low latency channel 316 is optimally disposed within a portion of the spectrum that is not susceptible to burst noise, thereby further preventing interleaving, while also avoiding LTE channels and low frequency channels. In at least one embodiment, low latency channel 316 is smaller than primary channel 318, but may be sized in accordance with the amount of low latency traffic. Low latency channel 316 may further include wide subcarrier spacing (e.g., 50 kHz) to reduce symbol period, and optionally, a single modulation profile.

Scheduler 300 is further useful with respect to downstream traffic in that it enables enforcement of the maximum downstream latency type length value (TLV) parameters, and optionally may require operating conditions that were previously only recommended. In some downstream embodiments, the Network Side Interface (NSI) may be made to greater than the radio frequency interface (RFI), and the disposition of the RFI within the communication network may further be redefined. Scheduler 300 is further adaptable to Hybrid Automatic Repeat reQuests (HARQs) in both the upstream and the downstream traffic, further enables minislot duration reduction in the upstream direction.

The exemplary embodiments above are described with respect to the implementation of a conventional 802.11ad wireless link. Nevertheless, the present embodiments may alternatively implements a dedicated channel to each station/AP. Furthermore, in the case of a relatively small number of stations and wide channels, the embodiments above may be further optionally configured to implement use beamforming, or dedicated frequency division duplexing/frequency division multiple access (FDD/FDMA) to create a dedicated "always available" pair of unidirectional channels to each station. Alternatively, such configurations may implement time division duplexing (TDD).

Figure 4:
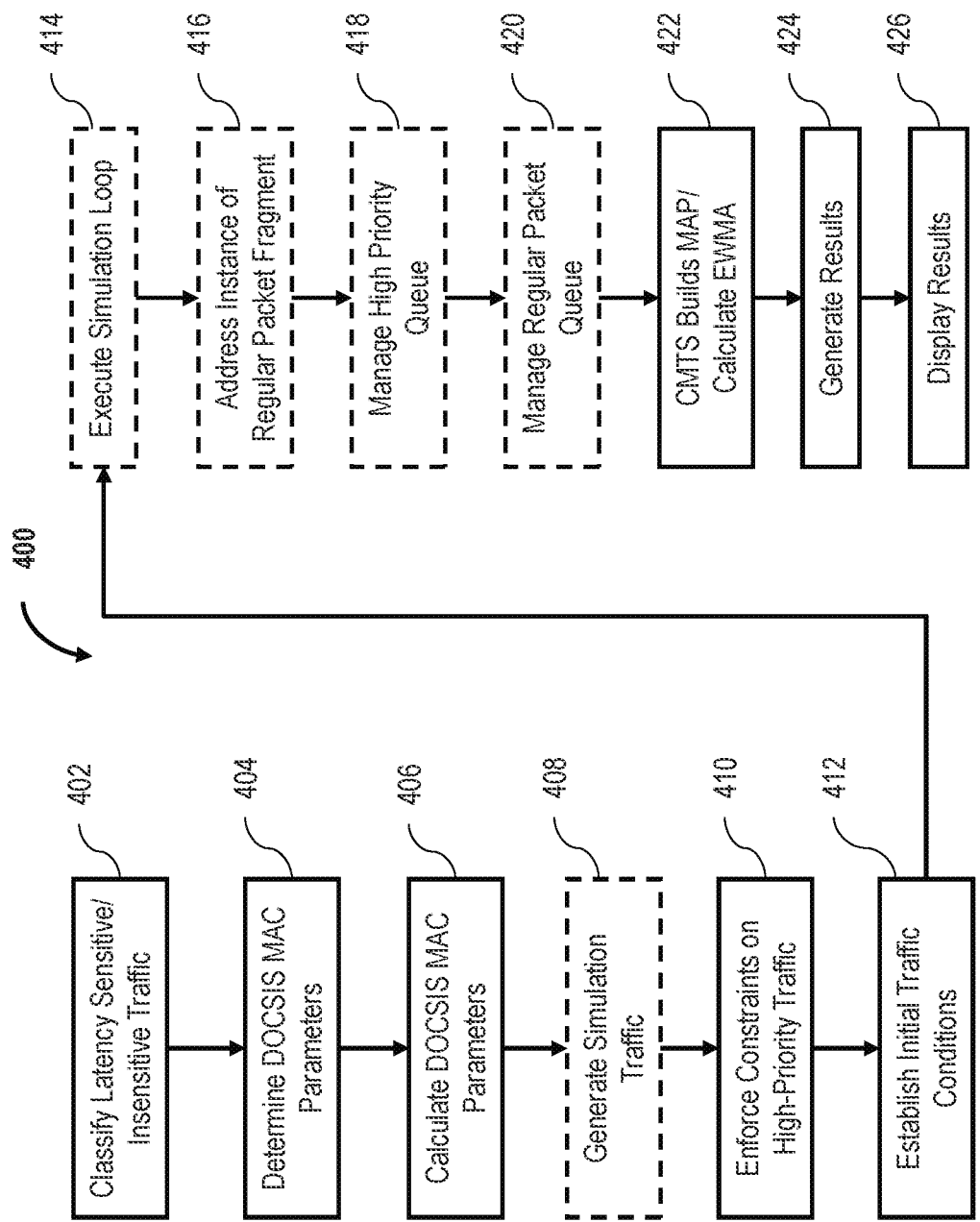
FIG. 4 is a flow chart diagram of an exemplary dual channel queue process for scheduling latency-sensitive traffic and latency-insensitive traffic, according to an embodiment.

FIG. 4 is a flow chart diagram of an exemplary dual channel queue process 400 for scheduling latency-sensitive traffic and latency-insensitive traffic. Process 400 may be implemented, for example, by a processor (e.g., through computer-executable instructions) and, or in cooperation with, scheduler 300, FIG. 3. Process 400 begins at step 402, in which incoming upstream traffic is classified as being one of latency-sensitive and latency-insensitive traffic. In step 404, process 400 determines the DOCSIS MAC parameters, including without limitation one or more of a subcarrier spacing, symbols per frame, a MAP interval, a round trip time (RTT) and/or 2-way propagation delay, a downstream interleaving delay, a MAP proc time of the CMTS, a MAC HDR size (in bytes), a latency target value, a maximum number of consecutive frames tolerable with zero grants, a minimum number of mini slots to grant in a frame, a maximum sustained rate, and an indicator value representing the speed at which the grant rate ramps down.

In step 406, process 400 calculates DOCSIS MAC parameters including without limitation one or more of a number of subcarriers per minislot, an OFDMA frame duration (in seconds), a number of minislots per frame (which may be rounded to account for upstream imperfections), a minislot capacity (in bytes), a CM MAP proc time, a CMTS receiver proc time (i.e., the time the CMTS waits for an entire frame to arrive before processing), a minimum request grant delay, a number of OFDMA frames in each MAP interval, a maximum grant interval, a minimum grant, a maximum grant. Step 408 is an optional step, which may be implemented in the case of a simulation. In step 408, process 400 generates traffic according to the parameters determined in step 404 and calculated in step 406. Where process 400 is implemented on existing traffic, step 408 may be avoided.

In step 410, process 400 enforces constraints on some or all of the high-priority traffic. In step 412, process 400 establishes initial traffic conditions, including without limitation a number of minislots granted in each frame, a number of minislots actually used by the CM in each frame, an ideal grant value, a depth of the remaining queue at the end of each frame, how many MAP intervals have been scheduled (in the case of a simulation of process 400, prior to the start of the simulation), a number of minislots per frame for the first k MAP intervals, a time that each regular packet arrives at the CMTS, a pointer to the last transmitted regular packet, a pointer to the last regular packet received at the CM, a time that each high-priority packet arrives at the CMTS, a pointer to the last transmitted high-priority packet, a pointer to the last high-priority packet received at the CM, and residual accounts for the fragment bytes of a packet that has already been sent.

Step 414 is an optional step, in the case where process 400 is implemented as a simulation. In step 414, process 400 executes a simulation loop that (i) performs CM side processing, (ii) updates for high-priority packets that have been received, and (iii) builds at least one first at least one frame in advance of the burst. In an exemplary embodiment of step 414, process 400 further executes a first sub-step 416 to address an instance where a regular packet has been fragmented, and sets an arrival time for the transmitted packet, and then builds, transmits, and decodes the packet. In a second sub-step 418 of step 414, process 400 manages the high-priority queue, and fills the grant with high-priority packets if the space remains in the grant and high-priority packets are waiting to be transmitted. In a third sub-step 420 of step 414, process 400 manages the regular packet queue, with regular packets if space remains in the grant and regular packets are waiting to be transmitted.

In step 422, process 400 causes the CMTS to build the next MAP. In an exemplary embodiment of step 422, process 400 calculates the EWMA of used minislots. Step 424 is an optional step. In step 424, process 400 generates results of the determination and calculation steps, including without limitation upstream latency statistics, tables, properties and totals of one or more of the several parameters described above. Step 426 is also an optional step. In step 426, process 400 causes a display device (not shown), which is in communication with the processor, to display one or more visual images relating to the results generated in step 424, including without limitation value plot and subplots, histograms, grids, titles and labels, legends, and panned wide displays or zoomed close-ups.

In an exemplary embodiment of step 426, such graphical plots may depict one or more of at least three separate low latency DOC SIS scheduler options. In a first of the three options, where no grant is received, process 400 may depict the signal from the CM or the CMTS as resembling a single square wave, where the rising edge of the square wave represents activation, the crest of the square wave represents a maximum value, and the trailing edge of the square wave represents a deactivation. In a second of the three options, where multiple grants per interval are received, process 400 may depict a plot resembling a rising and falling step function, with the various "steps" corresponding to the various instances of multiple grants. In the third of the three options, and also in the case where multiple grants are provided, each individual grant may be represented as resembling an individual square wave function in series. According to these advantageous embodiments, the length of an individual slot may be reduced in half (e.g., from 240 μs to 120 μs).

Low latency cannot be provided to all packets equally. However, according to the low latency DOCSIS techniques described herein, latency is reduced for all packets to some degree. Some conventional protocols are only able to obtain acceptable performance levels if the protocols are allowed to build up a large queue of packets inside the network (sometimes referred to as Queue-Building (QB) flows). Applications that do not need to build a queue to meet performance requirements are referred to as Non-Queue-Building (NQB) flows. The large packet queues of these QB flows will typically cause latency for all traffic, including the NQB flows. According to the embodiments herein though, two separate virtual paths are provided on the DOCSIS link, namely, one for QB flows, and the other for NQB flows. According to these advantageous systems and methods, QB flows can build up a large queue and still obtain desired performance levels, and the NQB flows can also obtain their own desired performance levels by avoiding the latency caused by the QB flows. The present embodiments thus enable an innovative "non-queue-building" variant of TCP that achieves line-rate throughput with minimal queueing delay. The techniques described herein enable scheduling such that the packets that do not cause delay will not be forced to wait for the packets that do cause delay, thereby rendering the present systems and methods of particular value to communication networks that have not implemented some of the more recent a AQM techniques.

The present embodiments further represents an improvement over conventional high-priority-vs-low-priority systems that merely provide preferential bandwidth access to a subset of traffic. The present embodiments do not include reservations or traffic contracts for different service flows, and no value judgments are made about the relative importance of some applications over others. That is, the present systems and methods still provide a "classic" queue for service flows implementing QB behavior which cannot fully utilize capacity without building a queue. NQB service flows, on the other hand, may utilize a separate short queue to avoid being stuck behind packets in the longer queue. Although both cues may be optimized for these two different types of traffic, neither queue is individually provided preferential access to bandwidth. Accordingly, the data traffic of one user will not impact the service of another user under these techniques.

Thus, implementation of the low latency DOCSIS techniques herein reduce delay of conventional AQM algorithms (e.g., DOCSIS-PIE, FQ-CoDel, etc.) by at least one additional order of magnitude. For example, the implementation of AQM to DOCSIS 3.1 reduced queuing delay under load from 100-200 ms to 10-20 ms. However, the $99^{th}$ percentile delay under this improvement was still approximately 100 ms, which is generally considered too great for many latency driven applications. The implementation of the present low latency DOCSIS techniques on top of conventional AQM techniques though, demonstrating to maintain the queuing delay below 1 ms at the $99^{th}$ percentile.

In some embodiments of the techniques described herein, service flows may mark individual packets as NQB, for example, using conventional ECN (e.g., "ECT(1)") or DiffServ Codepoint (DSCP) (e.g., "Expedited Forwarding") techniques. The present techniques though, further enable policing of the traffic flows in the event that a particular service flow is miscategorized, whether by accident or maliciously. The traffic scheduler of the present systems and methods is able to maintain a queuing score for the service flows that have recently impacted the queuing, and is configured to redirect packets having higher scores to the more appropriate queue (e.g., the classic queue). Such policing techniques are different than conventional techniques that merely limit bandwidth, in that according to the present embodiments, judgments are made based on the recent latency impact of each service flow, and thus the latency policing does not interfere with bandwidth allocations between flows.

Enhanced Queue Protection

This disclosure describes an embodiment of a Queue Protection function as defined for DOCSIS (Data Over Cable Service Interface Specification). Queue Protection is part of a Low Latency feature proposed to be introduced into DOCSIS. The Queue Protection function itself is introduced and defined below. This disclosure describes support for Low Latency in DOCSIS and describes details of a number of features on which Queue Protection depends.

In the exemplary embodiment, Low Latency DOCSIS (LLD) tackles the two main causes of latency in the network: buffering delay and media access delay. Buffering delay is mainly caused by the current TCP protocol and its variants (e.g. Quick UDP Internet Connections (QUIC) and Bottleneck Bandwidth and Round-trip propagation time (BBR)). LLD addresses this by allowing the use of next-generation TCP protocols (which don't cause buffering delay) and by allowing non-TCP applications to avoid waiting behind the delays caused by current TCP. Media access delay, on the other hand, is a result of the shared-medium scheduling types currently provided by DOCSIS, which emphasize bandwidth efficiency over latency. LLD addresses media access delay by adding support for a predictive scheduler which, while somewhat less efficient, can provide extremely low latency service.

The high level goal for Low Latency DOCSIS is to enable lower-latency DOCSIS upstream and downstream forwarding with high DOCSIS bandwidth efficiency. Specifically, a key objective is to achieve a 99%-ile round trip time of 1 millisecond for packets traversing the DOCSIS network. Another objective is to reduce median latency for all traffic, while not impacting TCP bulk data throughput. Finally, it is intended that Low Latency DOCSIS features be available "out of the box" (i.e. with minimal operator configuration) as much as possible, while still making configuration parameters available so that the operator can control the service when necessary.

One solvable source of latency on the Internet is buffering latency. The AQM function introduced in DOCSIS 3.1 provides a solution which substantially reduces "buffer bloat" and improves median latency. The newer low latency technology defined herein aims to achieve reliable (99%-ile) low latency for all traffic, by segregating queue-building from non-queue-building traffic (these terms are defined in more detail below).

In the exemplary embodiment, a dual-queue mechanism is provided for all traffic. This consists of A) one deep queue (with AQM) for queue-building traffic: this is known as the "Classic Queue;" B) one short queue (with AQM) for non-queue-building traffic: this is known as the "Low Latency Queue;" C) a mechanism for scheduling and balancing congestion across the two queues; and D) a mechanism for assigning traffic to the appropriate queue, ensuring that queue-building traffic is being assigned to the Classic Queue.

In the exemplary embodiment, the Dual queue mechanism is implemented by the CM for upstream traffic and by the CMTS for the Downstream direction. Each of the queues will implement its own AQM algorithm, and, in addition, the two AQMs are coupled with each other as described below.

Figure 5:
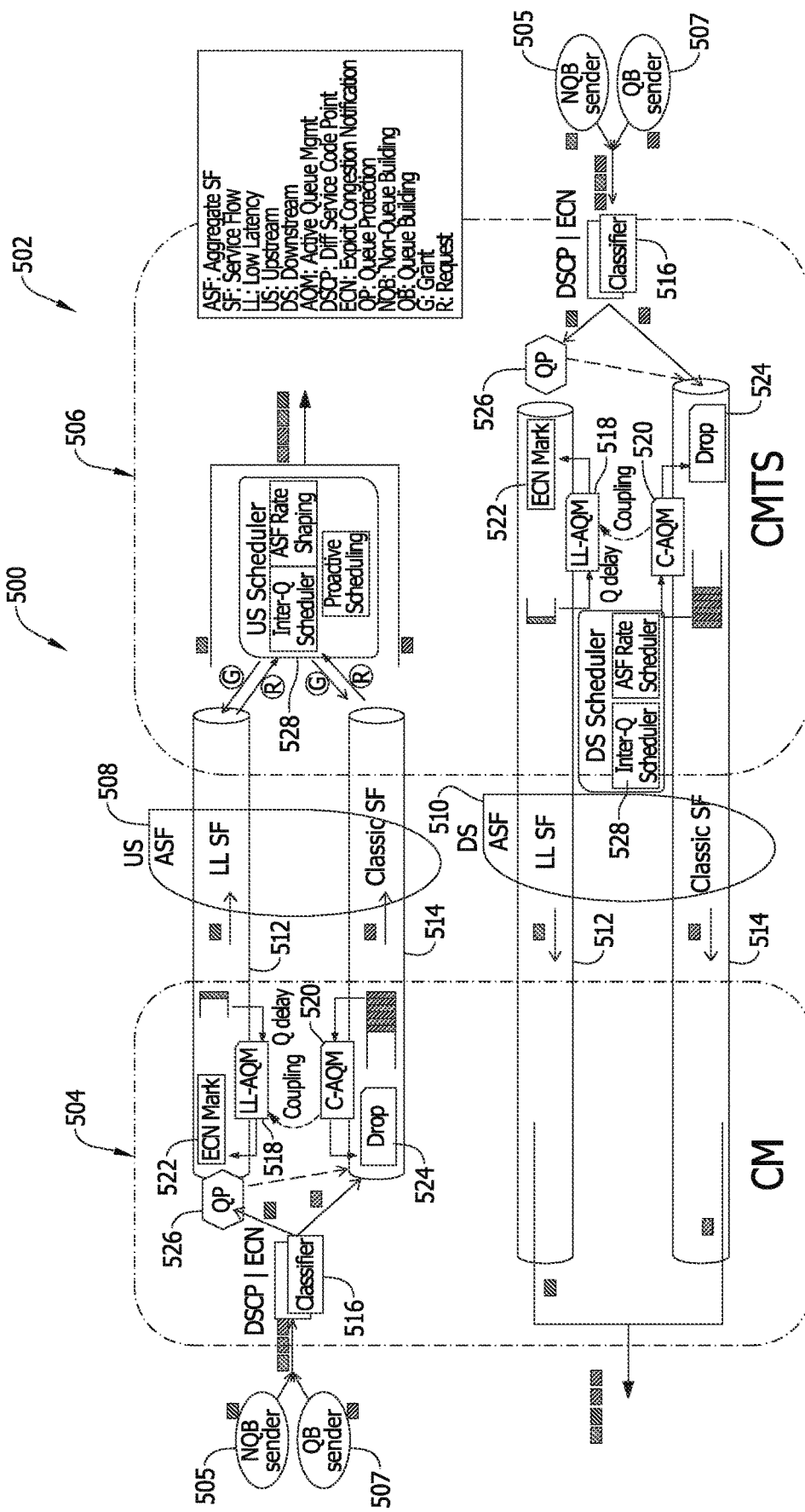
FIG. 5 illustrates a block diagram of a high level low latency system architecture for a DOCSIS network in accordance with at least one embodiment.

FIG. 5 illustrates a block diagram of a high level low latency system architecture 500 for a DOCSIS network 502 in accordance with at least one embodiment.

Low Latency services are provided by using a combination of queuing optimizations and scheduling improvements. As shown in FIG. 5 below both the CM 504 and CMTS 506 work together to enable lower latency across the DOCSIS network 502. At a high-level the low latency architecture 500 consists of a dual queue approach, for queue building 507 vs non-queue building traffic 505. This approach is implemented in the system 500 by an Aggregate Service Flow composed of two individual Service Flows. There is an Aggregate Service Flow for the upstream direction 508 and a separate one for the downstream direction 510. The constituent individual Service Flows within an aggregate service flow are the "Low Latency Service Flow" 512 and the "Classic Service Flow" 514. There can be more than one Aggregate Service Flow in each direction if an operator configures multiple services for low latency. This architecture 500 also supports a transition to next-gen TCPs that comply with the IETF's L4S architecture.

In both the upstream 508 and downstream direction 510, when the CMTS 506 creates the Low Latency Service Flow 512 and the Classic Service Flow 514, the CMTS 506 also configures classifiers 516 for the Low Latency Service Flow 512 and the Classic Service Flow 514 (if needed). By default the classifiers 516 for the Low Latency Service Flow 512 will classify all packets marked with the DSCP code point EF (and other codepoints for non-queue building traffic 505) and all packets marked as ECN Capable Transport into the Low latency service flow 512. All other traffic will default to the Classic Service Flow 514. It is expected that the Low Latency Service Flow 512 queue is shorter compared to the Classic Service Flow 514. Each of these Service Flows implements an AQM which is coupled to the other, where the Low Latency Service Flow AQM 518 implements Explicit Congestion Notification 522, while the Classic Service Flow AQM 520 utilizes packet drops 524.

In the upstream, the CM 504 implements a queue protection function 526, which protects the Low Latency Service Flow 512 from being overwhelmed by mismarked traffic, while the CMTS 506 implements the queue protection function 526 for the downstream.

In the upstream, there may be latency introduced due to the request-grant cycle. The CMTS 506 may also predictively issue grants to the CM 504, using a proactive grant service (PGS) scheduling type, in order to reduce the media acquisition delay seen by upstream traffic.

The CMTS rate shapes the upstream aggregate service flow by ensuring that the sum of the grants to the Low Latency Service Flow 512 and the Classic Service Flow 514 do not exceed the QoS envelope for the aggregate service flow. The CMTS rate also shapes the downstream aggregate service flow by ensuring that the combined traffic on the Low Latency Service Flow 512 and the Classic Service Flow 514 do not exceed the QoS envelope for the aggregate service flow.

In the exemplary embodiment, the CMTS 506 schedules across the two SFs 512 and 514 using an Interqueue Scheduler 528. In some embodiments, the architecture 500 supports two queues within an ASF 508 (Low Latency SF 512 and the Classic SF 514).

Queue-building traffic 507: Some applications use congestion controllers that are only able to achieve high link utilization if they are allowed to build up a large queue of packets inside the network 502. This is because the sending hosts cycle between cautiously increasing their rate and drastically cutting it when they detect a loss, which implies the queue has overflowed. Without a large queue, the regular drastic cuts would under-utilize the network. The sender 507 sends packets at a data rate that exceeds the available capacity of the link. Queue-building flows 507 use the 'TCP-Friendly' congestion controllers (e.g. Reno, BBR, CUBIC) which are traditionally used by TCP, QUIC, and derivatives such as TCP-Friendly adaptive real-time transports.

As used herein, Low Latency Aggregate Service Flow refers to an ASF 508 used for the low latency system architecture 500. As used herein Low Latency Service Flow (LLSF) 512, in regard to low latency system architecture 300, refers to the service flow that provides low-latency layer transport service via queueing and scheduling techniques. As used herein, Low Latency Queue refers to a queue that holds the data packets that will be transmitted on the Low Latency Service Flow 512. The Classic Service Flow 514, within the low latency system architecture 500, refers to a service flow that is intended to carry traffic that is not classified into the Low Latency Service Flow 512. The Classic Queue holds the data packets that will be transmitted on the Classic Service Flow 514.

Non-queue-building traffic 505 refers to Data flows from applications that either don't need to build up a queue to achieve high link utilization or do not need high link utilization. The sender 505 never sends packets at a data rate that exceeds the available capacity of the link. Non-queue-building flows 505 could be unresponsive UDP flows that send traffic at a relatively low data rate, and thus never build up a queue in the network. Non-queue-building flows 505 could also be L4S TCP flows that respond immediately to prevent queue build up.

The Low-Latency Low-Loss Scalable (L4S) Throughput approach supports congestion control algorithms that can achieve link capacity without causing latency and loss. Dual-queue coupled AQM is a queuing approach that supports a transition from Classic congestion controls to L4S congestion controls. An Interqueue Scheduler is a mechanism used to identify the amount of resources that will be allocated between the Low Latency Service Flow 512 and Classic Service Flows 514 that belong to a same ASF 508.

Queue Protection refers to a mechanism to prevent data erroneously classified as non-queue-building 505 from harming the queuing delay of other traffic in the Low Latency Queue.

A Dual Queue Coupled AQM consists of a Dual Queue structure that provides latency separation for non-queue building flows and a Coupled AQM that balances throughput across both queues. In some embodiments, the Dual Queue Coupled AQM consists of: A) a Dual Queue structure that provides latency separation for Non-Queue Building flows; and B) a Coupling between the AQMs that ensures that the capacity of the aggregate service flow is used roughly equally by traffic flows in either queue.

As the Dual Queue Coupled AQM architecture only provides one-way coupling from the Classic Service Flow 514 to the Low Latency Service Flow 512, it relies on the Inter-SF Scheduler to balance this by ensuring that conditional priority is given to the Low Latency Service Flow 512. "Conditional priority" means that traffic of the Low Latency Service Flow 512 will be serviced with a priority, yet without the Classic Service Flow being starved 514. For example, Weighted Round Robin (WRR) is a simple scheduler that achieves the desired results. Typically WRR schedules packets, but a simpler variant can be used to schedule a byte stream.

For Upstream ASFs 508, the CMTS 506 implements a WRR scheduler between the Low Latency Service Flow 512 and the Classic Service Flow 514 within the Aggregate Service Flow. For Downstream ASFs, the CMTS 506 implements a WRR scheduler between the Low Latency Service Flow 512 and the Classic Service Flow 514 within the Aggregate Service Flow.

In some embodiments, because the Low Latency system architecture 500 utilizes additional Service Flows, additional packet classifiers 516 may be used in order to ensure that non-queue-building packets 505 are queued to the appropriate Service Flow. These classifiers will contain additional TLVs that further specialize them to match non-queue-building packets (e.g. DSCP-EF).

In the exemplary embodiment, the low queuing delay for low latency services depends on applications sending their data smoothly in order not to build a queue. However, the data of a queue-building application might erroneously be classified into a Low Latency Service Flow 512, perhaps accidentally or maliciously. Queue Protection prevents such erroneous behavior from harming the queuing delay of other traffic in the Low Latency Service Flow 512. In normal scenarios without misclassified traffic, Queue Protection does not intervene at all in the classification or forwarding of packets.

In the exemplary embodiment, the queues for both service flows 512 and 514 that comprise the LLD Aggregate Service Flow are managed by two active queue management (AQM) algorithms 518 and 520 that are coupled together. These AQMs 518 and 520 are deployed at the CM 504 for the upstream and at the CMTS 506 for the downstream.

Data sources that tag their traffic to be classified into the Low Latency Service Flow (LL SF) 512 are expected not to build a queue by sending what is termed Non-Queue-Building (NQB) traffic 505, either by sending traffic at a low rate or by responding to Explicit Congestion Notification (ECN), which signals the early onset of queue growth.

If a data source has the logic to understand ECN signals, the data source will tag its packets with the ECN-Capable-Transport (ECT) codepoint in the 2-bit ECN field of the IP header (v4 or v6). And if the data source has Low Latency Low Loss Scalable throughput (L4S) congestion control logic to keep queuing delay extremely low, the data source will tag its packets with the ECT(1) codepoint in the ECN field. The AQM that manages the Low Latency Service Flow (the LL AQM) 518 helps such data sources keep the queue to a very shallow target by marking the ECN field increasingly frequently with the Congestion Experienced (CE) codepoint so that the queue approaches its target depth (usually configured to 1 ms using the SF AQM Latency Target parameter).

Responding to congestion signaling is less important for a low rate data source, which does not generally build a queue, so it will leave the ECN field cleared to zero, meaning 'Non-ECN-Cable Transport'. To ensure its packets are classified into the LL SF 512, the low rate data source will tag them with a Non-Queue-Building Diffserv Codepoint (DSCP).

Data sources that do not tag their traffic as NQB 505 in one of the above ways are called Queue-Building (QB) 507. Their traffic is classified into the Classic SF 514. The Classic AQM 520 keeps the Classic queue to a target delay that is as low as possible, but it cannot be as low as the target of the LL AQM 518. This is because QB traffic 507 is controlled by Queue-Building congestion controllers such as TCP Reno, Cubic or BBR, which under-utilize capacity if the queue is too shallow. The AQM 520 for a Classic SF 514 that is part of an LLD Aggregate SF is no different to the AQM for a stand-alone SF, except the drop probability that it applies is coupled across to the ECN marking level that the LL AQM applies.

The aim of coupling the two AQMs 518 and 520 together is to ensure data flows share the capacity of the Aggregate Service Flow as if it were a single pool of capacity. Thus, the two service flows appear as one from a bandwidth perspective, even though the low queuing delay into the LL SF 512 is isolated from that of the deeper queue into the Classic SF 514.

Figure 6:
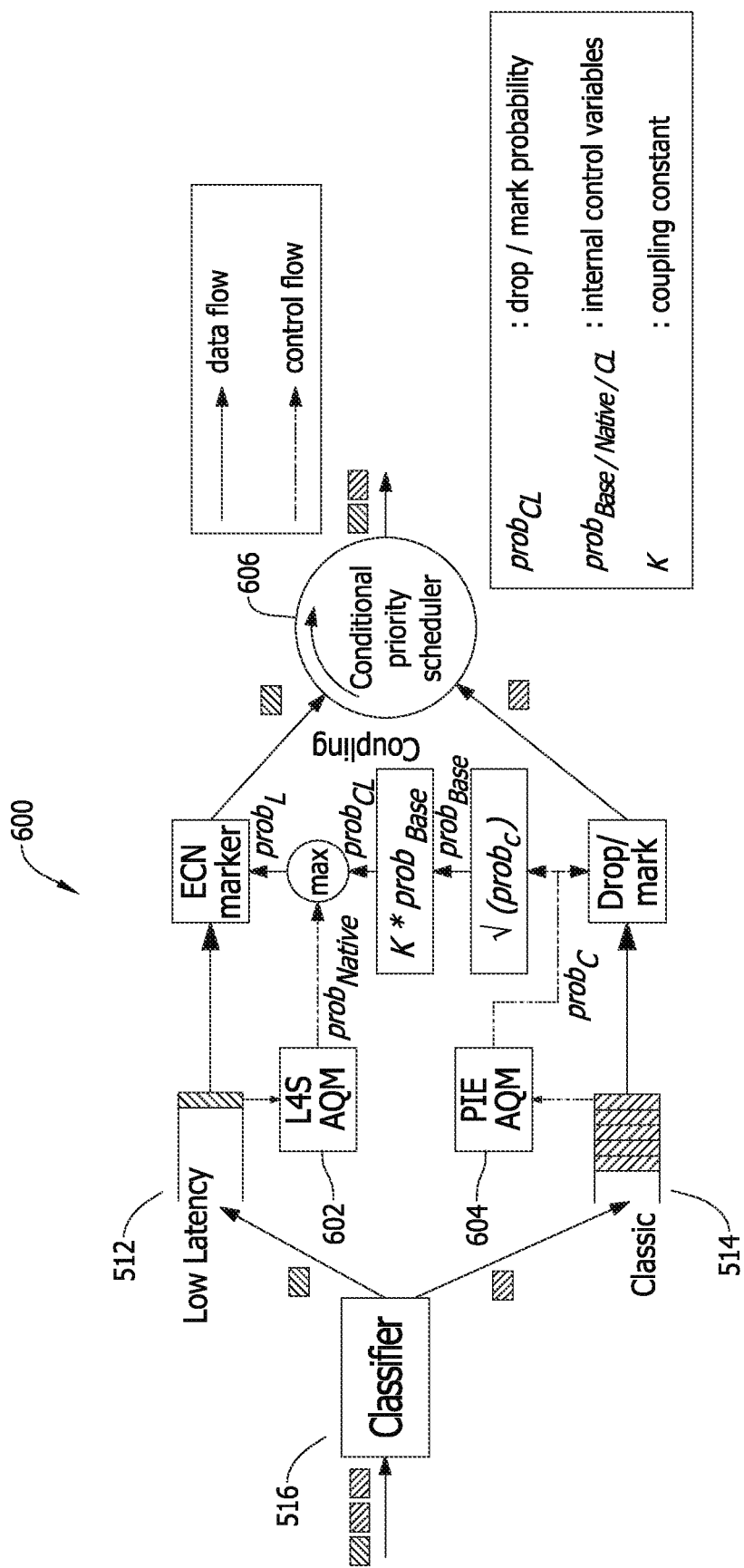
FIG. 6 illustrates a data flow diagram of a dual queue coupled AQM structure in accordance with at least one embodiment.

FIG. 6 illustrates a data flow diagram of a dual queue coupled AQM structure 600 in accordance with at least one embodiment. In structure 600, a PIE AQM 604 is coupled to a Low Latency AQM 602. The coupling makes the presence of traffic in the Classic SF 514 apparent to sources of LL traffic, so that LL flows make sufficient space for Classic flows. The Inter-SF Scheduler 606 ensures that, if there is traffic queued for the LL SF 512, it will be served immediately. So the coupling is necessary to ensure that LL traffic leaves enough space between its packets, so that Classic flows will have nearly equal access to the aggregate capacity.

The scalability of L4S data sources stems from the fact that their flow rate is inversely proportional to the congestion signaling level from the network. Whereas Classic data sources are unscalable because their flow rate is inversely proportional to the square root of the congestion signal. The goal is for L4S and Classic data sources to share the capacity of the aggregate SF as if they were all the same type of flow each using roughly the same share of the bandwidth pool. So the Classic drop probability is squared relative to probability that is coupled across to the LL queue, which counterbalances the square root relationship of Classic flow rates. FIG. 6 shows how this can be achieved using the PIE AQM 604.

Figure 7:
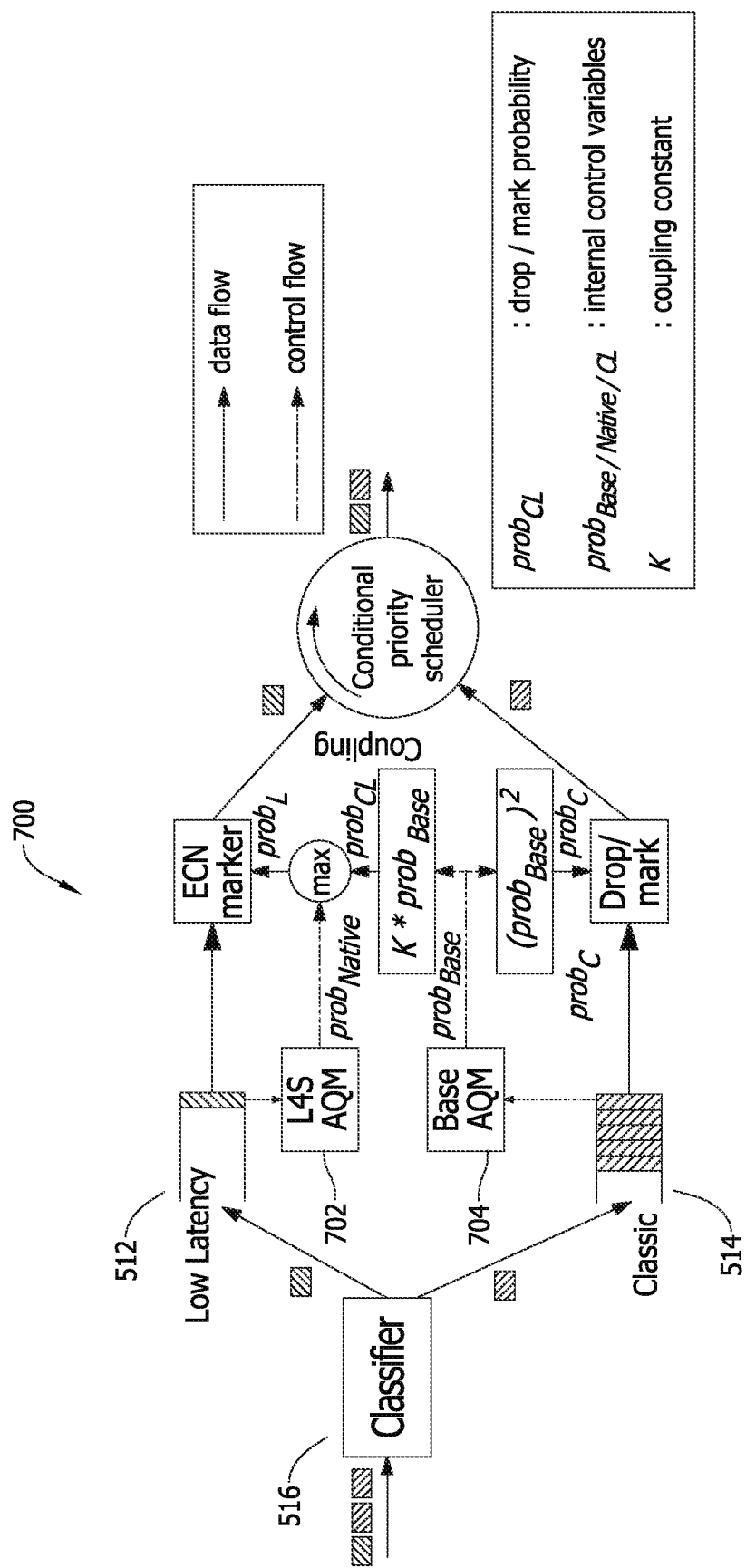
FIG. 7 illustrates a data flow diagram of alternative dual queue coupled AQM structure in accordance with at least one embodiment.

FIG. 7 illustrates a data flow diagram of alternative dual queue coupled AQM structure 700 in accordance with at least one embodiment. In structure 700, a Base AQM 704 is coupled to a Low Latency AQM 702.

In some embodiments, Queue Protection categorizes packets into the application data flows, termed Microflows. All packets of each Microflow are characterized by identical values in a set of header fields. The Queue Protection algorithm accumulates a queuing score per Microflow, which represents the degree to which that Microflow has recently been responsible for building the queue. If the queuing delay of the Low Latency Service Flow 512 is in danger of exceeding a critical threshold, Queue Protection removes packets of those Microflows with the greatest queuing score. By default it redirects such packets into the Classic Service Flow 514. In all normal scenarios where no Microflow is misclassified, Queue Protection is expected not to intervene at all in the classification or forwarding of packets.

In the exemplary embodiment, an Immediate Active Queue Management (IAQM) algorithm is supported by the cable modem 504 (shown in FIG. 5) if the low latency characteristic is enabled. The IAQM algorithm is used by Low Latency Service Flows (LL SF) 512 (shown in FIG. 5) as part of the Dual Queue Coupled AQM structure 600 and 700 (shown in FIGS. 6 and 7). The IAQM can also be used by a CMTS 506 (shown in FIG. 5) for downstream LL SFs 512, also as part of a Dual Queue Coupled AQM structure 600 and 700.

The IAQM algorithm is typically only applied to packets that indicate that the end-to-end transport supports Low Latency Low Loss Scalable throughput Explicit Congestion Notification (L4S ECN). The data sender does this by setting the ECT(1) codepoint in the ECN field of the IP header [RFC8311]. This codepoint is one of the default classifiers that classifies L4S ECN packets into the LL SF.

The IAQM signals increasing congestion by marking the Explicit Congestion Notification (ECN) field of the packet's IP header (v4 or v6) with the Congestion Experienced (CE) codepoint. The CE marking is also one of the default classifiers for the LL SF 512—because the ECT(1) codepoint might have been changed to CE earlier in the path.

In order to introduce minimal delay into the feedback loop, the IAQM signals queue growth immediately rather than attempting to smooth out short term variations. The L4S data senders are configured to smooth the signal themselves, when appropriate.

It is common for the drain rate of the LL queue to vary given it shares Aggregate Service Flow capacity with the Classic queue. Therefore, all the queue parameters and queue measurements taken by the IAQM are cast in units of queuing time, not queue size, so that they remain inherently correct as the drain rate varies.

The IAQM uses a ramp function to determine the likelihood of ECN-marking each packet dependent on the current queuing delay. The marking probability rises from 0 to 1 between minimum and maximum queue delay thresholds.

As explained above, the marking and drop probabilities of the LL and Classic queues are coupled together, but the Classic probability is squared relative to that of the LL queue to counterbalance its square root relationship with the Classic flow rate. The LL AQM 518 (shown in FIG. 5) compares the probability from the native LL AQM 518 to the probability coupled across from the Classic AQM 520 (shown in FIG. 5) and uses the larger of the two. Then, as LL data sources seek out their maximum flow rate, they will converge on the point where the greater of the outputs from both queues is minimized, which will be when they are equal.

In some embodiments, the ramp function used for the IAQM algorithm is the same as the ramp function used for Queue Protection. This helps to ensure that the basis of Queue Protection decisions is transparent to end-users and application developers, who can be assured that they are unlikely to trigger Queue Protection if they follow a recommended response to ECN signals from the IAQM.

In the exemplary embodiment, the parameters for the IAQM algorithm are may be defined along with the parameter for the coupling between the IAQM and the Classic AQM. The queue delay thresholds for the ramp may be configured by setting the minimum threshold and the range between the minimum and the maximum thresholds. The function can be effectively made into a step by reducing the range of the ramp to its minimum value.

For a low aggregate maximum sustained rate (AMSR) SF, a threshold set in units of time could represent a very small number of packets in the queue. For example, at 12 Mb/s a 1 ms threshold would lead to ECN marking whenever the queue exceeded a single 1500B packet. Therefore any configuration that would set a threshold at less than 2 maximum transmission units (MTUs) is automatically increased to this floor of 2 MTU, otherwise the ECN-marking level would always be close to 100% in such cases.

In one embodiment, the Parameters for the IAQM algorithm include, but are not limited to: MINTH_us (which represents the Min marking threshold in µs for QP and IAQM), LG RANGE (which represents the Log base 2 of the range of ramp in lg(ns) for QP and IAQM, which may default to 2^19=524288 ns (roughly 525 µs)), and BUFFER SIZE (which represents the size of the buffer for the LL service flow in B—this may be a value of 100 µs which is multiplied by the ASF Maximum Sustained Rate (AMSR). The Parameter for the coupling between Classic and LL queues is LG K (which is the Log base 2 of coupling factor and is dimensionless). The system may use one or more internal constants for the algorithm, such as, but not limited to: PROB OVERLOAD (which is the threshold for probCL_ over which C queue is overloaded), MAX PROB (for integer arithmetic, the system would use a large integer e.g. 2^31, to allow space for overflow), MINTH=MINTH_us*1000 (the Min marking threshold in ns), FLOOR=2*8*ifMTU*10^9/ AMSR (the Minimum marking threshold of 2 MTU for slow links in ns), ifMTU (the Interface max transmission unit in B), AMSR (the Max Sustained Rate of Aggregate SF in b/s), RANGE=(1<<LG RANGE) (which is the Range of ramp in ns), MAXTH=MINTH+RANGE (the Max marking threshold in ns), and K=1<<LG K (a Coupling factor that defaults to 2^1=2).

if(MINTH<FLOOR){RANGE=max(RANGE-(FLOOR−MINTH),1);MINTH=FLOOR}   EQ. 1

In EQ. 1, RANGE is adjusted to keep MAXTH unchanged or at least no lower that FLOOR, which a minimum of 1 to avoid divide by zero issues.

The system also considers public variables, such as, but not limited to: qdelay (The current queuing delay of the LL queue in ns) and probNative (The current native probability of the LL queue within [0,1]). The system may also have internal variables. As uses herein internal variables end with " ". These internal variables include, but are not limited to, ecn_ (The ECN codepoint of the packet), probCL_ (The probability coupled from the Classic AQM), probL_ (The current ECN marking probability [0,1] of the LL queue), and count (a Deterministic ECN marking counter stored between packets). Some external variables may include, but are not limited to, packet (The structure holding packet header fields), and qC.probBase (the Probability output by the base AQM (if PI2) or the square root of drop_prob from the PIE AQM).

The IAQM data path uses a variable calculated every qC.INTERVAL in the control path of the Classic AQM 520 (shown in FIG. 5). The base probability qC.probBase for use in the IAQM data path might be derived in two possible ways. First, if the Classic AQM 520 uses the PI2 algorithm, it naturally calculates qC.probBase as the first stage in calculating qC.drop_prob_. Second, if the Classic AQM 520 uses the PIE, algorithm qC.probBase can be derived from the drop probability of the Classic PIE queue, qC.drop_prob_ in an extension to the PIE control path.

The entry point to the Immediate AQM data path may be the function iaqm( ) which returns the enum IAQM_EXIT_STATUS. In some embodiments, hardware that does not support drop or ECN-marking on dequeue can call iaqm( ) on enqueue. Given LL queue delay is generally small relative to the RTT, the extra control-loop delay due to running the AQM at the tail is relatively small.

The code for the Immediate AQM Data path can be divided into three main conditional blocks: A) processing L4S packets, to decide whether to mark, drop or forward them unchanged; B) processing non-L4S packets; and C) handling overload, which applies to all packets equally, bypassing both the above code blocks.

In order to determine whether to resort to the overload code, the marking probability is compared with the PROB_OVERLOAD parameter (default 100%). For the comparison a marking probability is needed that represents persistent overload, so probNative is not appropriate, because it is based on the instantaneous queue delay so small transients frequently take it over 100%. Instead, the coupled probability probCL is used, because that is derived from the Classic queue, which is smoothed over multiple sample INTERVALs, and if there is overload in the LL queue there will always be Classic overload too. Accordingly, iaqm algorithm calculates the coupled probability.

In the non-overload case, the packet is tested for L4S support by testing whether the LSB of its ECN field is set. This matches ECN codepoints ECT(1) and CE, but not ECT(0) and Not-ECT.

For L4S packets, first the native probability of the LL queue probNative is calculated, using a ramp algorithm. Then, iaqm algorithm calculates the LL marking probability probL_ as the maximum of the native probability probNative of the LL queue and the coupled probability probCL_ from the Classic queue. It then returns EXIT_CE with likelihood probL_ and EXIT_FWD otherwise. These exit codes tell the calling function to forward the packet respectively with or without a CE-mark. Note that, if the native probability is 100%, there is no need to combine it with the coupled probability, as the result will always still be 100%. So, at the point where iaqm algorithm determines probNative is 100%, it returns EXIT_CE straight away.

For a non-L4S packet, the routine tests for one of two sub-cases. In the case of a non-ECN (Not-ECT) packet, all congestion signaling is suppressed, because a non-ECN packet classified into the LL queue is not expected to build a queue and not expected to be responsive to congestion signals either. The overload code still provides a back-stop if these assumptions turn out to be incorrect. Thus, for a non-ECN packet, iaqm algorithm simply returns EXIT_FWD.

In the case of an ECT(0) packet, even though the operator must have deemed it appropriate to classify certain ECT(0) packets into the LL SF, it is assumed that the data source still expects a Classic level of ECN marking (i.e. the square of the L4S level). Therefore, the iaqm algorithm returns EXIT_CE with probability qC.drop_prob_ and EXIT_FWD otherwise. However, this Classic ECN-marking is applied relative to the LL target delay, not the Classic target.

In the case of overload, the LL queue disables ECN marking as required. L4S data sources fall back to Classic behavior in response to drops. So, when the LL SF 512 is using drop as a congestion signal, it simply uses the AQM 520 of the Classic SF 514. Thus traffic in either queue will see the same drop probability and they will both aim for the same Classic target delay, which is appropriate for flows that have fallen back to queue-building behavior.

In the exemplary embodiment, the system supports multiple queue-related utility functions. These functions return an estimate of the current queue delay of three different types of queues. These includes LL queue and classic queue when they are coupled, and for single queue, when they are not coupled.

These functions are based on q_byte_length (which is the length of the queue in bytes (incl. the packet to enqueue)) and tb_msrtokens (which is the max sustained rate token bucket depth of the shaper).

For a PIE AQM control path, the three functions uses parameters including, but not limited to, COUPLED (a Boolean to indicate whether the queue is part of a DualQ Coupled AQM), INTERVAL (the sample interval in the Classic queue control path in ms), and PEAK_RATE (the Peak rate of the token bucket shaper b/s). For the PIE AQM control path, the three functions may also use variables such as, but not limited to, qL (The Low Latency queue), qC (The Classic queue), and interval_bitsL (The bits served by the LL queue in the previous sample INTERVAL). An intermediate AQM parameter may include AMSR (the Max Sustained Rate of the Aggregate SF in b/s). An Inter-Queue Scheduler parameter may include WEIGHT (the Weight of the WRR inter-queue scheduler). And an internal variable may include r_L_ (the Calculated rate of the LL queue over the previous sample INTERVAL).

In some embodiments, the delay of a Low Latency queue is calculated for every packet, so the function may use a very simple approximation for queue delay: byte_length/AMSR. This may be used for the typical case when LL traffic paces itself rather than having to be limited by the scheduler. Then, when LL traffic arrives, it will typically be served at the rate of the aggregate SF. The rate of the ASF can vary depending on link congestion and on the state of the token bucket shaper. However, this estimate just uses the max sustained rate of the aggregate, AMSR, which is essentially a constant so there will be opportunities for optimization of the divide operation.

The delay of the Classic queue is only calculated every INTERVAL so processing cost is low. However, it is not essential to take into account details like the state of the token bucket, because only a sample of the queue delay is needed, so average drain rates can be used.

When the queue is a Classic queue that is part of a Dual Queue Coupled AQM, the queue delay is calculated as: byte_length/(AMSR-r_L_), where r_L_ is an estimate of the arrival rate at the LL queue during the next sample INTERVAL of the Classic queue. Although the past is not a good predictor of future traffic behavior, it is the only data available. r_L_ is estimated using: r_L_=min(interval_bitsL/INTERVAL, WEIGHT*AMSR). The second term of the min( ) is necessary because the scheduler will prevent r_L_ from persisting above this level.

If the queue is not part of a Dual Queue Coupled AQM, the a qdelaySingle function will use the original DOCSIS PIE formula for queue delay, which takes account of the current state of the token bucket shaper.

In some embodiments, the Immediate AQM algorithm depends on the Explicit Congestion Notification (ECN) field of a packet. For IPv4, the ECN field is in bits 1:0 of the second octet in the IPv4 header, formerly called the ToS octet. For IPv6, the ECN field is in bits 1:0 of the former Traffic Class field. This field spans two octets in the IPv6 header. As a result, the ECN field is in bits 5:4 of the second octet.

An AQM algorithm that supports ECN indicates increasing congestion in a stream of packets by congestion-marking the ECN field more often. Congestion-marking involves setting both bits of the ECN field to 1. Note that for IPv4 congestion marking, the IPv4 header checksum (HCS) must also be updated.

The calling function is responsible for determining whether the packet supports ECN-marking. ECN-marking is only permitted on packets that arrive with a non-zero ECN field. If the ECN field of a packet has the binary value 00, then that packet must not be ECN marked (drop is the only valid indication of congestion). If the ECN field has the binary value 11, then it has already been ECN-marked, and marking it again simply leaves it unchanged.

In the exemplary embodiment, a Queue Protection supports the CM 504 in the upstream. The Queue Protection algorithm is supported by the CMTS Queue Protection algorithms. In either direction, this algorithm is intended to be applied solely to a Low Latency Service Flow 512. The algorithm detects queue-building Microflows and redirects some or all of their packets to the Classic Service Flow 514 in order to protect the Low Latency Service Flow 512 from excessive queuing. A Microflow is fully defined below, but typically is an end-to-end transport layer data flow.

The algorithm maintains per-Microflow state that holds a "queuing score" representing how much each Microflow was responsible for recent queuing. Under normal conditions, when queuing delay is low, Queue Protection does not intervene at all. However, as each packet arrives, if the queuing delay of the Low Latency Service Flow exceeds a threshold, Queue Protection comes into play. Queue protection redirects packets out of the Low Latency Service Flow 512 if they belong to Microflows with excessive queuing scores.

Per-Microflow state is only persistently held for those Microflows most responsible for queuing. The flow state of a non-queue-building Microflow ages out of the system so rapidly that its memory can be re-used as the packets of other non-queue-building Microflows arrive.

As each packet arrives, the algorithm either creates or updates the state for the Microflow to which that packet belongs. The algorithm holds this state in a structure called a bucket, because of its similarity to a classical leaky bucket. However the queuing score does not represent bits, the score represents a normalized amount of queuing, termed the congestion-volume, which is the product of the size in bytes of each packet and the probability of congesting the queue at the time the packet is processed.

To derive this queuing score, the Queue Protection algorithm uses the same underlying logic as the Immediate AQM algorithm described above. Both algorithms use the same linear ramp function to normalize instantaneous queuing delay into a probability in the range [0,1]. This improves processing efficiency, and also helps to ensure that the basis of Queue Protection decisions is transparent to end-users and application developers, who can be assured that they are unlikely to trigger Queue Protection if they follow a recommended response to ECN signals from the IAQM.

The queuing score is both accumulated and aged over time. To make aging the score efficient, the queuing score is normalized to units of time, so that it represents how long it will be before the queuing score ages to zero.

Whenever a packet arrives, if a bucket is not already associated with the packet's Microflow, the algorithm looks for an existing bucket with a score that has aged out. Given this bucket is no longer necessary to hold state for its previous Microflow, the bucket can be recycled for use by the present packet's Microflow.

All the functions of Queue Protection operate on the data path, driven by packet arrivals. The functions used for Queue Protection are divided into those that are primarily mechanism or primarily policy. In some embodiments, functions pick_bucket( ) and fill_bucket( )maintain per-Microflow queuing scores and manage per-flow state are considered primarily as mechanism. qprotect( ) is primarily concerned with policy.

Queue Protection algorithm is configured with multiple parameters. The names of the corresponding AsfQosProfile Extension Object Attribute are shown in brackets. These parameters include, but are not limited to: QPROTECT_ON ([QPEnable bit 0] Queue Protection is enabled if TRUE, PROTECTPERuFLOW ([QPEnable bit 1] Once a microflow is sanctioned, if TRUE all its packets are impacted), CRITICALqL_us ([QPLatencyThreshold] Threshold delay of L queue in µs), CRITICALqLSCORE_us ([QPQueuingScoreThreshold] The threshold queuing score in µs), and LG_AGING ([QPDrainRateExponent] The aging rate of the queuing score, as an exponent of 2, of the congestion-rate in congestion-byte/s). The congestion-rate is the rate of bytes in congestion-marked packets i.e. default aging rate=2^17B/s=128 KiB/s=1.048 Mb/s.

The Queue Protection algorithm uses the following internal constants: AGING=pow(2, (LG_AGING-30)) (which Converts lg([B/s]) to [B/ns]), CRITICALqL=CRITICALqL_us*1000 (which Converts μs to ns), CRITICALqLSCORE=CRITICALqLSCORE_us*1000 (which Converts μs to ns), CRITICALqL-PRODUCT=CRITICALqL*CRITICALqLSCORE (where the Product is used as a threshold), ATTEMPTS (the Max no. of attempts to pick a bucket where the default is vendor-specific), BI SIZE (the Bit-width of index number for non-default buckets), NBUCKETS=pow(2, BI SIZE) (the number of non-default buckets), and MASK=NBUCKETS-1 (a convenient constant, filled with ones). In some embodiments, Nanosecond precision can be justified by comparison with microsecond precision, because a 1 us interval between minimum-sized UDP/IP datagrams (~30B) would only scale to 240 Mb/s, which would give insufficient headroom to scale up the rate in future.

The Queue Protection algorithm also depends on the following variables external to the Queue Protection algorithm: qL.probNative (The current ECN marking probability [0,1] from the Native AQM for the L queue), qL.qdelay (The current queuing delay of the L queue in ns), pkt.size (The size of the packet currently being processed in B), pkt.uflow (The microflow identifier of the packet currently being processed—e.g. 5-tuple or 4-tuple if IPSec). In some embodiments, the bucket is structured to hold a per-microflow state including id (the identifier (e.g. 5-tuple) of the microflow using the bucket) and t_exp (expiry time where (t_exp—now) is the microflow's normalized queuing score in ns). The time origin for t_exp could be recalibrated infrequently at run-time so that the size of the t_exp variable would not have to be prohibitively large.

As described above, the qprotect( ) algorithm returns an exit status to either forward or redirect the packet. The pick bucket( ) algorithm returns a bucket identifier, and fill bucket( ) is used to fill the bucket. The entry point to these functions is qprotect( ) which would be called as part of packet classification. The classifier 516 checks to see if the packet is classified to Low Latency Service Flow 512 and then confirms that by calling qprotect( ) algorithm. If qprotect( ) provides a redirect instruction, then the classifier 516 forwards to the packet to the Classic Service Flow 514, otherwise the packet is sent to the Low Latency Service Flow 512.

The qprotect( ) algorithm uses the current time [ns], the bucket index, and the queuing score of pkt's flow [ns]. The qprotect( ) algorithm calls the pick bucket( ) algorithm to get the bucket identifier. Then the qprotect( ) algorithm determines if bckt_id→t_exp at risk of overflow and then returns a redirect instruction. Otherwise, the qprotect( ) algorithm determined whether to sanction packet by testing if Qdelay is over a threshold and if microflow's q'ing score scaled by QL.delay/CRITICALqL exceeds a CRITICALqLSCORE. If so, then the qprotect( ) algorithm provides a redirect instruction, otherwise it provides a forward instruction.

The pick bucket( ) algorithm goes through a loop checking all of the buckets to determine ownership for the packet and the associated microflow. In some embodiments, the pick bucket( ) algorithm also records the first bucket, if any, that could be recycled because it's expired. However, the pick bucket( ) algorithm does not recycle a bucket until it's completed all the ownership checks. In some embodiments, ownership checks are based on checking hash masks for each bucket.

The Reference Queue Protection algorithm categorizes packets into Microflows, in order to accumulate a queuing score per Microflow. All packets of each Microflow are characterized by identical values in a set of header fields. Such a set of header fields is termed a tuple, and the term n-tuple is used for a tuple consisting of n header fields. In contrast to classification of packets into Service Flows, categorization of packets into Microflows only requires the relevant tuple of header fields to be defined, not particular values in those header fields. This annex describes which tuples define a Microflow for Queue Protection purposes.

The concept of a Microflow is primarily intended to distinguish different end-to-end transport layer flows, that is, flows of Upper Layer Protocols with respect to IP. In some embodiments, different sets of headers that define a 'Microflow' may be used in different scenarios. The goal is for a Microflow categorization algorithm to be able to handle any type of packet, including non-IP packets.

The definitions apply equally to Microflow Categorization by the CM 504 in the upstream direction and by the CMTS 506 in the downstream direction.

For IP (v4 or v6) packets with the IP Upper Layer Protocols listed herein (TCP, UDP, etc), a CM 504 or CMTS 506 categorize such packets into Microflows using the 5-tuple or 4-tuple of header fields defined below.

To categorize certain IP packets into Microflows, a chain of headers might need to be traversed. A CM 504 or CMTS 506 decapsulates those encapsulating headers tabulated below in TABLE 1. A CM 504 or CMTS 506 may also decapsulate other encapsulating protocols (e.g. Layer-2 Tunneling Protocol v3 (L2TPv3; type 115)). If the categorization algorithm of a CM 504 or CMTS 506 traverses such a chain of headers, its depth of search is vendor-dependent and should be consistent for packets with the same sequence of header encapsulations.

If a CM 504 or CMTS 506 traverses such a chain of headers and finds one of the IP Upper Layer Protocols listed below (TCP, UDP, etc), the CM 504 or CMTS 506 proceeds with categorization of packets into Microflows using the 5-tuple or 4-tuple of header fields defined below. If the CM 504 or CMTS 506 fails to find one of the listed IP Upper Layer Protocols, the CM 504 or CMTS 506 categorizes such packets into Microflows using the 3-tuple defined below. In some embodiments, a CM 504 or CMTS 506 categorizes IPv4 fragments into Microflows using the 3-tuple of header fields defined below. A CM 504 or CMTS 506 may categorize any packets of Ethertypes other than IP (v4 or v6) into one Microflow per 3-tuple of Ethertype, source and destination MAC addresses. A CM 504 or CMTS 506 may also decapsulate headers of certain Ethertypes that are likely to encapsulate an IP header. If the categorization algorithm of a CM 504 or CMTS 506 decapsulates such non-IP Ethertypes, its depth of search is vendor-dependent and should be consistent for packets with the same sequence of header encapsulations. If a CM 504 or CMTS 506 traverses such a chain of headers and finds an IP header (v4 or v6), the CM 504 or CMTS 506 proceeds with categorization of packets into Microflows as for IP packets. If the CM 504 fails to find an IP header, the CM 504 or CMTS 506 categorizes such packets into Microflows using the 3-tuple of Ethertype, source and destination MAC addresses.

For packets classified into the same Service Flow, when categorizing into Microflows a CM 504 or CMTS 506 ignores the header fields, such as, but not limited to, logical link control (LLC) parameters (e.g. different 802.1Q VLAN IDs), Inbound ifIndex, the IPv6 flow label, the ECN field within the IPv4 Type of Service field or IPv6 Traffic Class field, and the Diffserv field within the IPv4 Type of Service field or IPv6 Traffic Class field.

IP packets (v4 or v6) are categorized dependent on the Protocol field in the outermost IPv4 header or the Next Header field in the outermost IPv6 header. In either case (IPv4 or v6), the goal is to find the header of an IP Upper Layer protocol with well-known flow identifiers (such as those tabulated in Annex P.3.3.1 (e.g. TCP, UDP). If the Protocol number or Next Header type of the outermost header is not one of these IP Upper Layer protocols, but it is one of the common encapsulating protocols tabulated below, it is decapsulated and the same procedure is repeated recursively until an IP Upper Layer protocol header is found. Also, for Microflow Categorization purposes, the Encapsulating Security Protocol (ESP; type 50) is considered as an IP Upper Layer Protocol.

TABLE 1

| Protocol No. (IPv4) or Next Header (IPv6) | Description | Regular IPv6 Format? | Header size and offset to Protocol Field, if not IPv6 format |
|---|---|---|---|
| 0 | IPv6 Hop-by-Hop Option | Y | |
| 4 | IPv4 encapsulation | N | Regular IPv4 header |
| 41 | IPv6 encapsulation | Y | |
| 43 | Routing Header for IPv6 | Y | |
| 44 | Fragment Header for IPv6 | Y | |
| 47 | Generic Routing Encapsulation (GRE) | N | 16 octet, bit 16 |
| 51 | Authentication Header (AH) | Y | |
| 60 | Destination Options for IPv6 | Y | |
| 135 | Mobility Header | Y | |
| 139 | Host Identity Protocol (HIP) | Y | |
| 140 | Shim6 Protocol | Y | |
| 253 | Use for experimentation and testing | Y | |
| 254 | Use for experimentation and testing | Y | |

If a Microflow Categorization algorithm follows the above process and finds an IP Upper Layer Protocol with well-known flow identifiers the algorithm will categorize the packet using the tuples of headers specified below.

To limit per-packet processing the depth of such a search for an IP Upper Layer protocol has to be limited. However, it would not produce consistent results unless it always searched to the same depth for the same sequence of headers. If the search within an IP packet for an IP Upper Layer protocol is curtailed, the procedure below for categorizing IP packets without well-known flow identifiers is used, and the last Protocol Number (IPv4) or Next Header (IPv6) that was found before the search ended is used as the IP Upper Layer protocol.

Certain IP Upper Layer Protocols are currently known to distinguish application data flows in the first 32 bits, for example:

TABLE 2

| Protocol | Protocol number |
|---|---|
| TCP | 8 |
| UDP | 17 |
| DCCP | 33 |
| ESP | 50 |
| SCTP | 132 |
| UDP-Lite | 136 |

Packets with such IP Upper Layer Protocols are categorized into one Microflow if they share identical values of the following 5-tuple or 4-tuple: A) IP Upper Layer Protocol; B) source and destination IP addresses; and either of: C1) source and destination port numbers, for TCP, UDP, UDP-Lite, SCTP, DCCP, etc. and C2) Security Parameters Index (SPI) for IPSec Encapsulating Security Payload (ESP) [RFC4303].

If the IP Upper Layer Protocol is known not to identify an application data flow in the first 32 bits (e.g. IGMP, ICMP, RSVP, OSPF, etc.), or decapsulation fails to find an inner IP Upper Layer Protocol with well-known flow identifiers, all packets of that IP Upper Layer Protocol are categorized as one Microflow if they share identical values of the following 3-tuple: A) IP Upper Layer Protocol type and B) source and destination IP addresses.

If an IPv4 packet is fragmented, only the first fragment carries the header of the IP Upper Layer Protocol. It would add complexity to associate subsequent fragments with the first. To avoid this complexity, fragments of IPv4 packets (i.e. IPv4 packets with either the More Fragments flag set or a non-zero fragment offset) would all have to be categorized by the following 3-tuple: A) IP Upper Layer Protocol and B) source and destination IP addresses.

The default classifiers for the Latency Service Flow solely select certain IP packets. Nonetheless, additional classifiers could be configured such that a Queue Protection algorithm would need to categorize non-IP packets into Microflows. Queue Protection categorizes any packets of Ethertypes other than IP (v4 or v6) into one Microflow per 3-tuple of Ethertype, source and destination MAC addresses. For example, all Point to Point Protocol over Ethernet (PPPoE) packets between the same MAC addresses would be categorized as one Microflow and all Remote Direct Memory Access over Converged Ethernet v1 (RoCE v1) packets between the same MAC addresses would be categorized as another Microflow.

A Microflow categorization algorithm could decapsulate headers of certain Ethertypes (e.g. PPPoE) that are likely to encapsulate an IP header. Then Microflow categorization would proceed as for IP packets shown in TABLE 1. To limit per-packet processing the depth of such a search would have to be limited. However, it would not produce consistent results unless it always searched to the same depth for the same sequence of headers.

For packets classified into the same Service Flow, when categorizing into Microflows the following fields are ignored, even though superficially they might seem relevant: A) logical link control (LLC) parameters (e.g. different 802.1Q VLAN IDs); B) Inbound ifIndex; C) the IPv6 flow label; D) the ECN field within the IPv4 Type of Service field or IPv6 Traffic Class field; and E) the Diffserv field within the IPv4 Type of Service field or IPv6 Traffic Class field. For example, packets classified into the same Service Flow with the same 5-, 4-, 3- or 1-tuple as specified above but with different VLAN IDs, flow labels or Diffserv codepoints would not be categorized as distinct Microflows.

In some embodiments, the sender tags the packets as non-queue building This may be using the ECN X1 or DSC PEF classification. In response to this, the Queue protection system described above uses a "trust but verify" approach. This includes verifying the behavior of the tagged packets, such as by expelling packets from the LL SF 512 that are in flows that cause the most queuing. This may include expulsion of the flow or the sender from the LL SF 512.

In other embodiments, the senders don't tag their packets and all packets default to the LL SF 512. In these embodiments, packets and/or flows are expelled from the LL SF 512 when they exhibit queuing behavior. This requires the system to make an "educated guess" about the packets and/or associated flows. For example, if UDP and the ECN is not equal to 10, then the packet/flow could be non-queue building. Another example rule could be if the packet/flow is UDP and cached.

In some of these embodiments, the Queue Protection would expel individually tagged packets that do not fit with the trust but verify approach. At some point, then the Queue Protection would expel the entire flow that those expelled packets are associated with. For those packets that are not explicitly tagged, but are under the educated guess approach, the system would expel the whole flow on a hair trigger. The idea behind a hair trigger is that there is a strong need to protect the LL latency from the QB UDP flows, and that the educated guesses are not definitive.

Another advantage of expelling entire tagged flows that the sender tagged incorrectly is to discipline the sender. Furthermore the educated guess flows are expelled because the system guessed wrong. However, in this expelling the system needs to be careful to ensure that no harm comes to UDP flows as they are being switch from LL to classic. This harm could be reording or a lack of low latency. To address these issues, the system may add the IP Protocol==UDP to the default LL classifier. This may address the issue of trying getting the system to work without requiring the senders to tag appropriately.

In using the LL classifiers, there are some general pros and cons. End-to-end traversal may be a problem for ECN X1 and DSCP EF, but should work for UDP with Queue Protection (QP). This is possible to mitigate by wiping when there is no evidence of dropping or throttling. Reordering of queue building flows is a potential problem ECN X1 and UDP+QP, but should work for DSCP EF. Requiring Evangelism works for UDP+QP, but presents some issue for ECN X1 and DSCP EF that may be resolved, but would require coordination of several organizations.

Figure 8A:
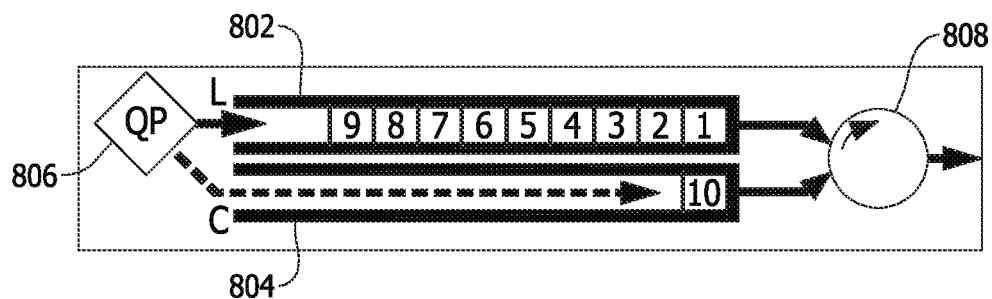
FIGS. 8A-8C illustrate queues that have triggered reordering.
Figure 8B:
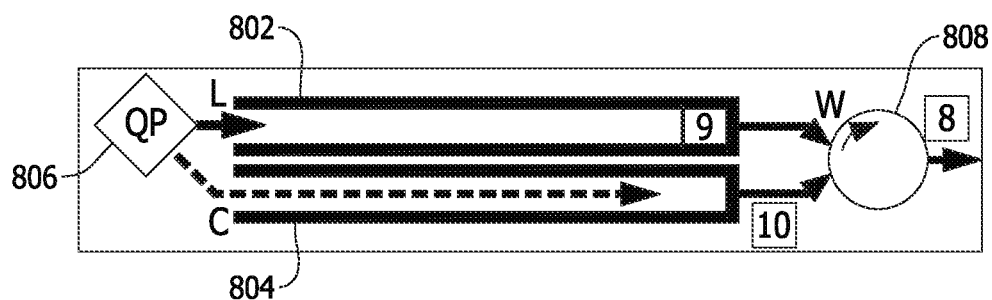
Figure 8C:
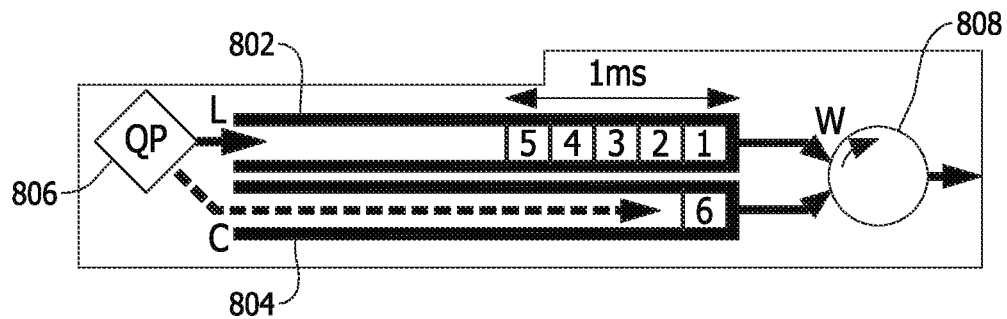

FIGS. 8A-8C illustrate queues that have triggered reordering. In these FIGs, the scheduler 808 has a weight of 9/10, so it will serve 9 packets from the L queue 802 before it servers 1 packet from the C queue 804. In FIG. 8A, the QP 806 has placed packets 1-9 in the L queue 802 and packet 10 in the C queue 804. FIG. 8B shows that packets 1-8 have been served and that packet 10 is next to be served.

Reordering may occur if there are enough packets in the L queue 802 and the weight is low enough. There be enough packets in the L queue 802 to cause reordering if the queue does not exceed the QP's delay threshold (e.g., 1 ms) with fewer packets or if receives a high number of packets in a small time. Therefore, reordering will occur if the departure rate (MSR) is high and the scheduler weight is too low. Furthermore, FIG. 8C illustrates an LL queue 802 with reordering occurring to the queue reaching the delay threshold.

Figure 9A:
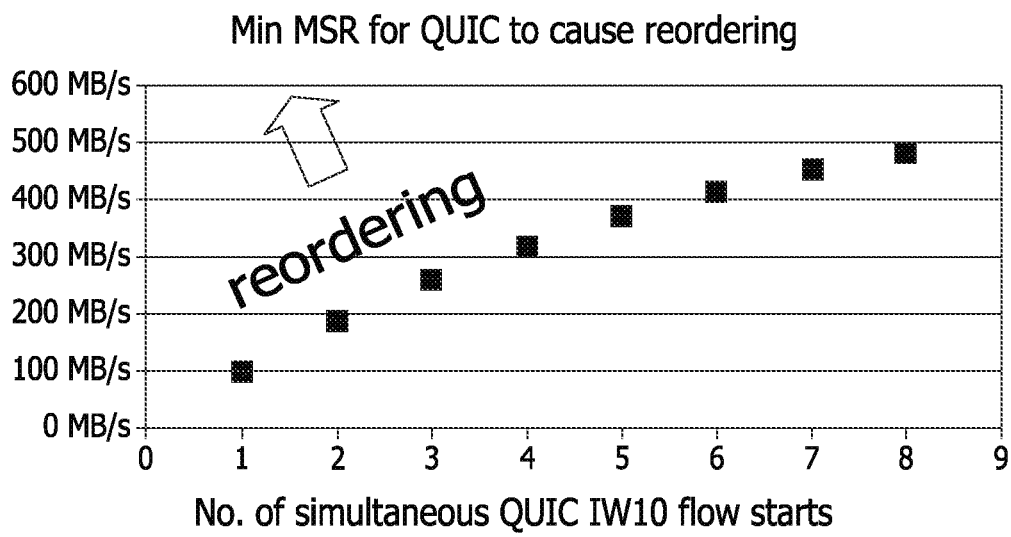
FIG. 9A illustrates a graph of the minimum MSR for QUIC flows to cause reordering.
Figure 9B:
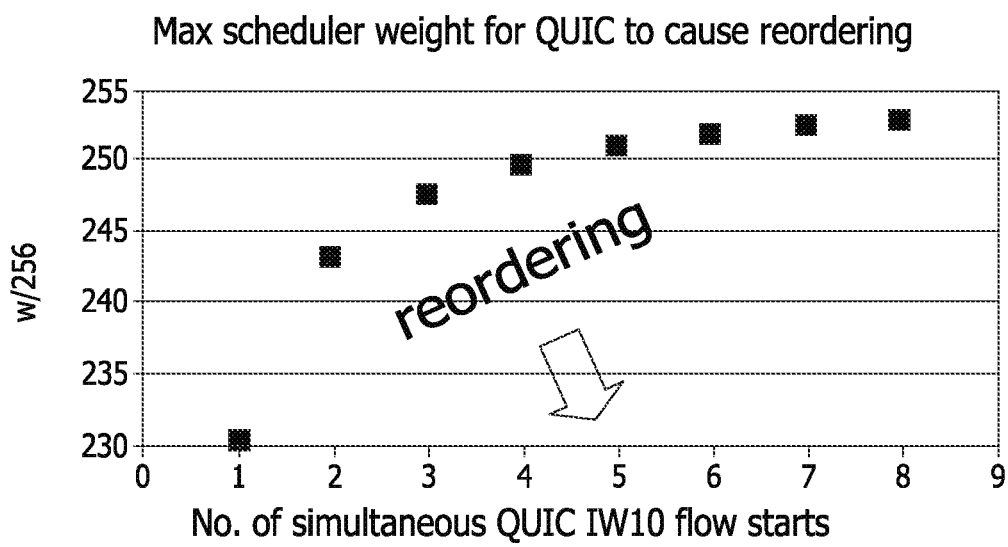
FIG. 9B illustrates a graph of the Max scheduler weight for QUIC flows to cause reordering.

FIG. 9A illustrates a graph of the minimum MSR for QUIC flows to cause reordering. FIG. 9B illustrates a graph of the Max scheduler weight for QUIC flows to cause reordering. One of the scenarios that may cause reordering would be multiple QUIC flow starts, where each would have a burst of 10 packets. FIG. 9A shows the minimum MSR that would cause reordering. FIG. 9B shows the maximum scheduler weight that would cause reordering.

Figure 10:
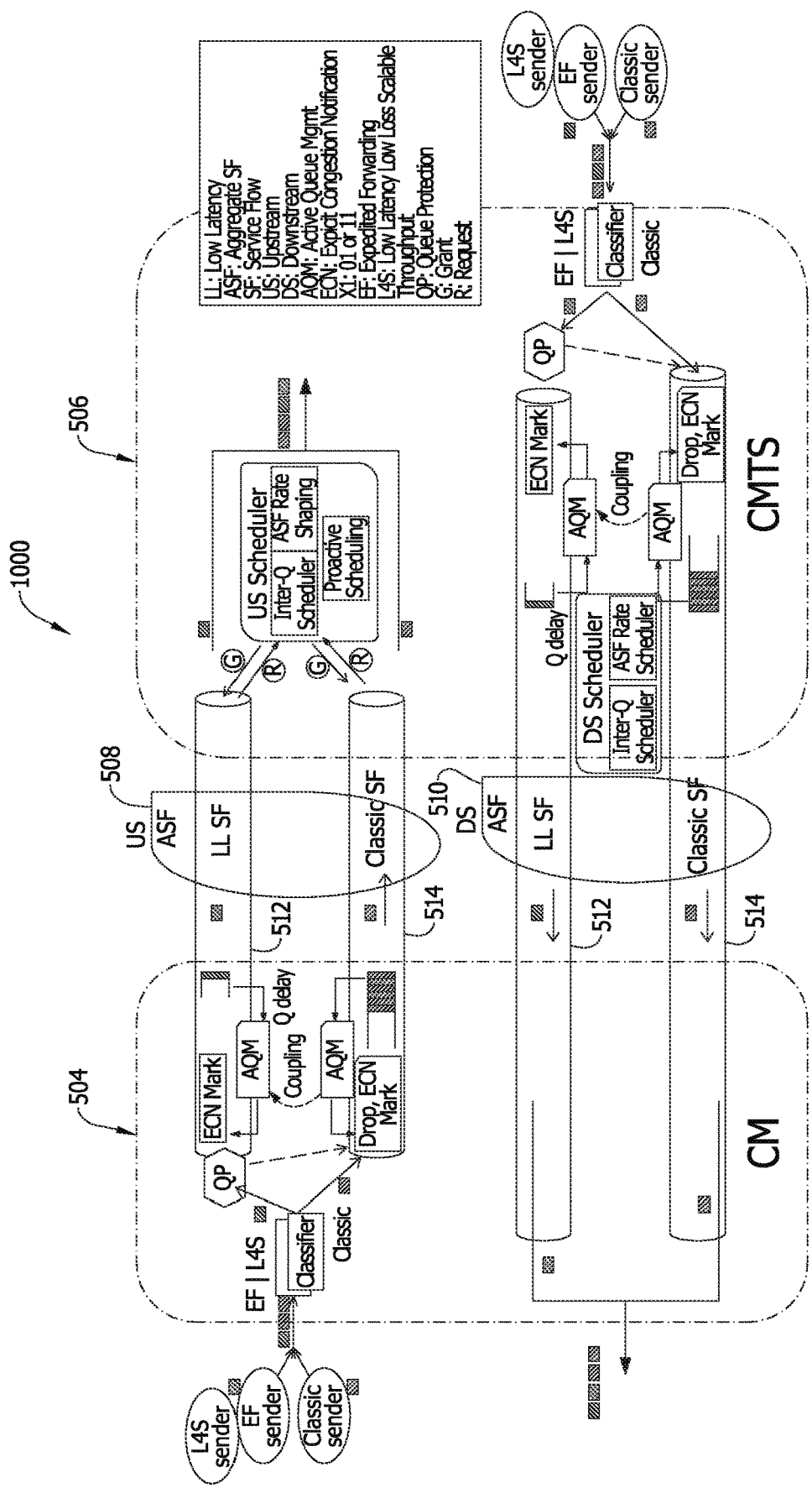
FIG. 10 illustrates a system architecture for implementing a per-flow queuing score approach in accordance with at least one embodiment.

FIG. 10 illustrates a system architecture 1000 for implementing a per-flow queuing score approach in accordance with at least one embodiment. In the exemplary embodiment, system architecture 1000 is similar to system 500 (shown in FIG. 5).

In this embodiment, DualQ low latency processes are provided both at CM 1004 and CMTS 1006. In this embodiment, Queue protection is provided between microflows (5-tuples) within a customer's DOCSIS service flow. The Queue Protection sets limits on appropriate source behavior to control service fidelity. This creates an incentive for the source to behavior; otherwise, the source harms itself and its traffic. The Queue Protection provides a defense in depth against bugs, unforeseen circumstances, and malice. The Queue Protection is always on, but expected to intervene rarely as needed. The goal is to minimize the likelihood that "well-behaved" flows are impacted by "ill-behaved flows. Another goal is to ensure all flows are not starved. Furthermore, the system needs to control the bandwidth sharing between the flows and to ensure good performance (aka low loss, in-order delivery, and low latency) for "poorly behaved" flows. The system may ensure that mismarking of flows degrades their performance to preserve incentives for correctly marking flows.

Figure 11:
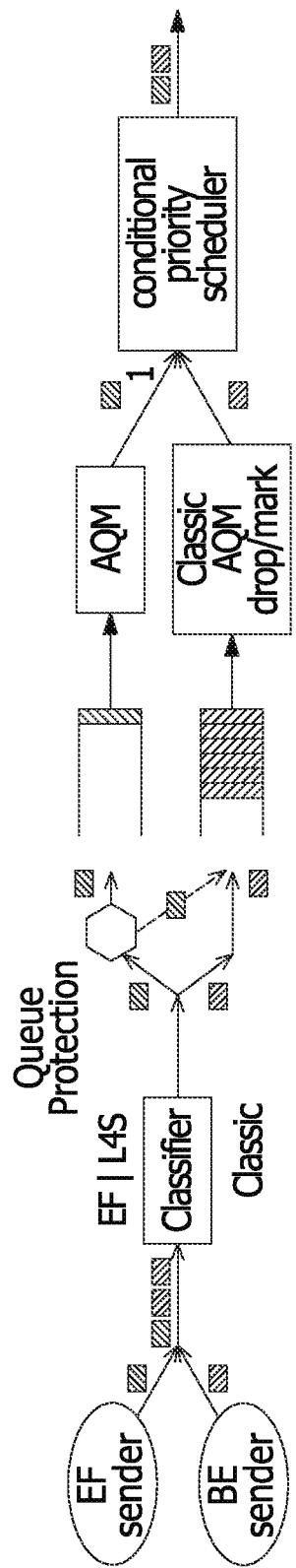
FIG. 11 illustrates a basic solution for routing packets between two queues.

FIG. 11 illustrates a basic solution for routing packets between two queues.

Figure 12A:
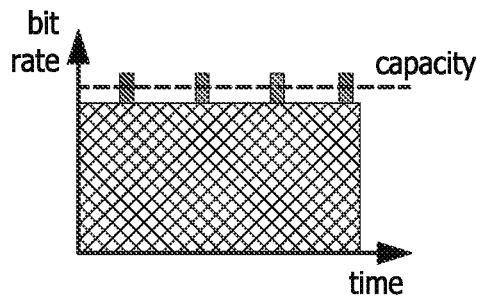
FIGS. 12A and 12B illustrate issues between different flows.
Figure 12B:
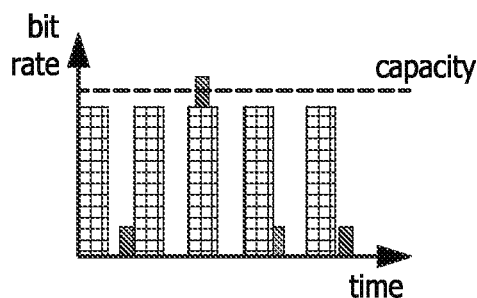

FIGS. 12A and 12B illustrate issues between different flows. In FIG. 12A the flow exceeds the capacity as the bit rate is constant and high. In FIG. 12B, the capacity is only exceeded once, despite the flow comprising a plurality of bursts.

In some embodiments, possible solutions include, but are not limited to, short FIFO (first in first out) queues, having the network select Low Latency packets, and Per-Flow Pre-conditioning. One of the issues with short FIFO is that there is no memory and thus no focused punishment mechanism. Having the network select the low latency packets causes the queueing to be limit to what the re-marker allows in. This is only possible for some apps and would not be supported by VPNs (virtual private networks). The Per-Flow Pre-conditioning would be similar to the EF Token bucket approach, but would have to be very conservative.

In the exemplary embodiment, the system 1000 would track ill-behaved flows. There would be a specific state for well-behaved flows, that would be rapidly released. The system 1000 would also limit the flow state to a few ill-behaved flows, plus a few recent other flows. In this embodiment, the system 1000 would only sanction packets when the actual queue risks exceeding the threshold. The system 100 would then reclassify arriving packets that belong to the most ill-behaved flows.

The system 1000 would use scores for queue protection and starvation protection. The system 1000 would measure queuing of the aggregate in pre-threshold. The system 1000 would then score each flow's contribution to queueing, based on a per-flow memory. The system 100 would then age the scores while rapidly releasing those flows in the well-behaved flow state. The system 1000 then reclassifying the packets from the highest scoring flows when delay would exceed the threshold. Optionally, the system 1000 would also reclassify the packets when in queue starvation.

Figure 13:
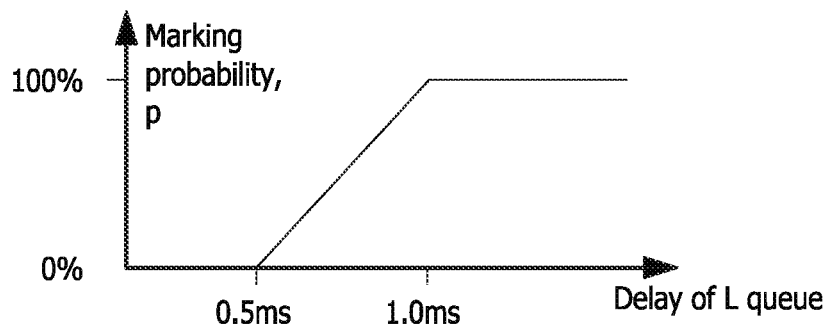
FIG. 13 illustrates a graph of the probability of marking a flow based on the associated delay of the L queue 512.

FIG. 13 illustrates a graph of the probability of marking a flow based on the associated delay of the L queue 512. In some embodiments, the queuing score is based on a probability from an internal AQM based on the instantaneous queue delay. This approach is accumulated per flow and creates the flows congestion rate by scaling each packet's size by the AQM probability.

Figure 14:
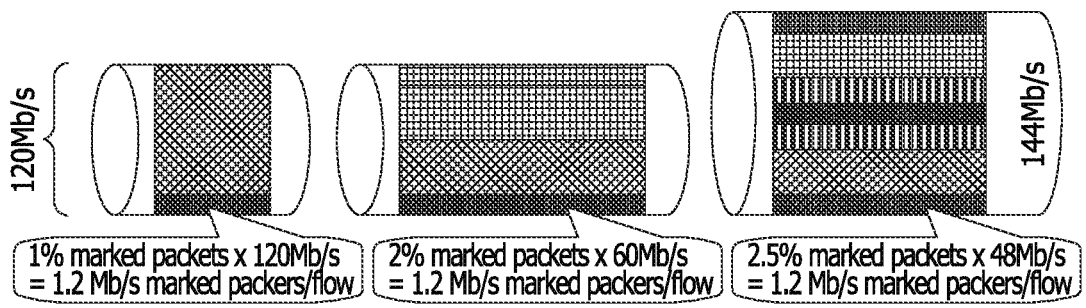
FIG. 14 illustrates the scalability of using aging queuing scores.

FIG. 14 illustrates the scalability of using aging queuing scores. The congestion rate is invariant for any flow rate. Furthermore, the system 1000 ages out queuing scores at a constant rate, V.

Figure 15:
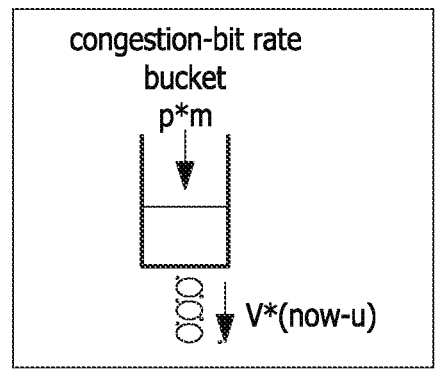
FIG. 15 illustrates accumulating and aging queuing scores.

FIG. 15 illustrates accumulating and aging queuing scores. As shown in FIG. 15, the bucket accumulates a congestion rate (p*m) per packet where m is the packet's size. V is a constant congestion drain rate which is used for aging the queuing score. This may be accumulated per packet, similar to a token bucket. The system 1000 accumulates the size of each packet (m) scaled by congestion (p), aka+p*m. The system 1000 ages the score at a constant congestion-rate by multiplying V by the time since the last update (u), aka-V*(now-u). Combining these for each packet achieves the queuing score–Q_score+=p*m–V*(now-u).

Figure 16:
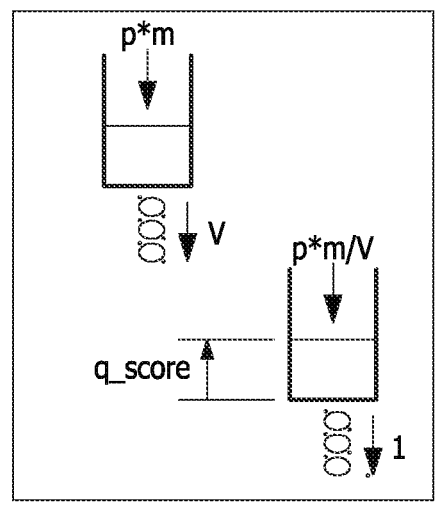
FIG. 16 illustrates a process of optimization for the buckets.

FIG. 16 illustrates a process of optimization for the buckets. The system 1000 may simplify the scorekeeping by normalizing the above Q_score to p*m/V–(now-u). This may be done by using $V=2^{17}$, which allows for bit-shifting instead of dividing. The system 1000 adds the queuing score, (p*m)[byte], normalized by the congestion rate, V[bytes/s], into time unites. Therefore, the bucket depth becomes the time left to drain. Conceptually, each bucket continually drains with time.

In some embodiments, there are two methods to determine the time state in the bucket. q_score represents the normalized queuing score as the time to drain. When q_score=0 the bucket is initialized. This way a bucket that has drained to less than or equal to zero is the same as a new bucket. Therefore buckets at or below zero may be recycled. In the first method whenever the bucket is used, it must be updated (drained) first, so q_score-=now-u, where u is the last update time. In the second method, the bucket is always up to date, but whenever it is used, the score is derived as q_score=t_exp—now, where t_exp is the bucket expiry time. When this is performed per packet, there is more searching for an expired bucket rather than filling it, so the second method is more efficient in processor and memory usage.

Figure 17:
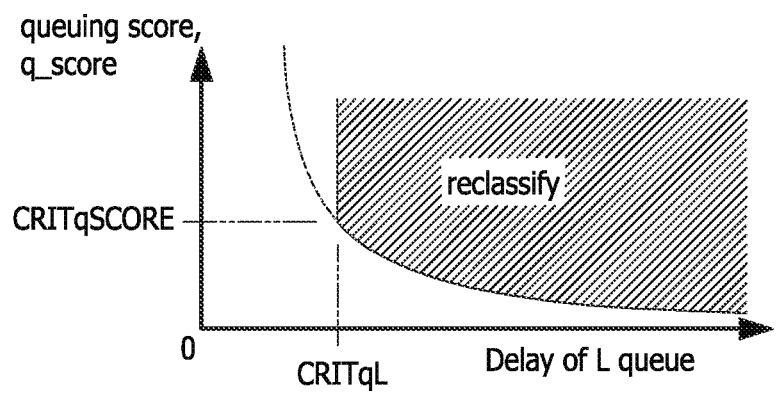
FIG. 17 illustrates a graph of using the queuing score to determine when to reclassify a flow.

FIG. 17 illustrates a graph of using the queuing score to determine when to reclassify a flow. In FIG. 17, the q_score is the bucket depth or the time to drain the bucket. The system 1000 reclassifies the flow if the queue delay exceeds a critical threshold and the product of the queue delay and the queuing score exceeds a second threshold. The system 100 determines if the queuing score weighted by the normalized queue delay exceeds the queuing score threshold.

Figure 18:
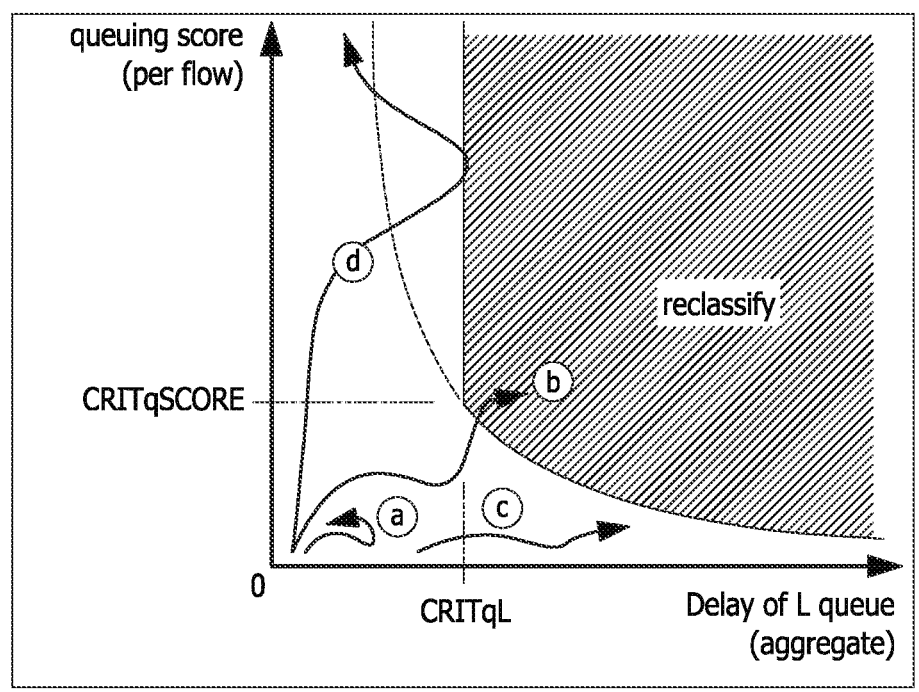
FIG. 18 illustrates a variation of the graph shown in FIG. 17 including exemplary flow types.

FIG. 18 illustrates a variation of the graph shown in FIG. 17 including exemplary flow types. Flow type A shows a non-queue building flow, either short or long-running. Flow type B displays a mismarked queue building flow, which is eventually reclassified. Flow Type C illustrates one or very many non-queue building flows, where sanctions are deferred. In this case, more queue building flows are expected to be sanctioned first. Flow Type D illustrates a long running non-queue building flow, which could be a collection of non-queue building flows within a VPN or tunnel. In the exemplary embodiment, the flows are always tested in a consistent order to always map the flows to the same buckets.

In some embodiments, the system 1000 reclassifies the whole flow using the Queue Protection, in both up-stream and down-stream directions. This is to protect the low latency queue from all packets from mismarked flows, to exploit flow classification hardware if available, and free up queue scoring flow-states and processing load. In these embodiments, the queuing score measures the potential to cause. The system 1000 is configured to not reclassify a flow, such as Flow Type D, if it is not causing harm. While Flow Type D has a high queuing score, it is not the cause of delay of the L queue and thus it is no reclassified. Furthermore, queuing delay measures actual harm, but not blame. To measure blame for actual harm, queuing score and queuing delay need to be combined to pay attention to the proportion rather than the actual numbers. The system 1000 does not reclassify a whole flow for the odd reclassified packet, if the flow has kept delay low for millions of other packets. This proportion also needs to be aged, where a recent high proportion is more serious than the same proportion spread evenly over history.

Figure 19B:
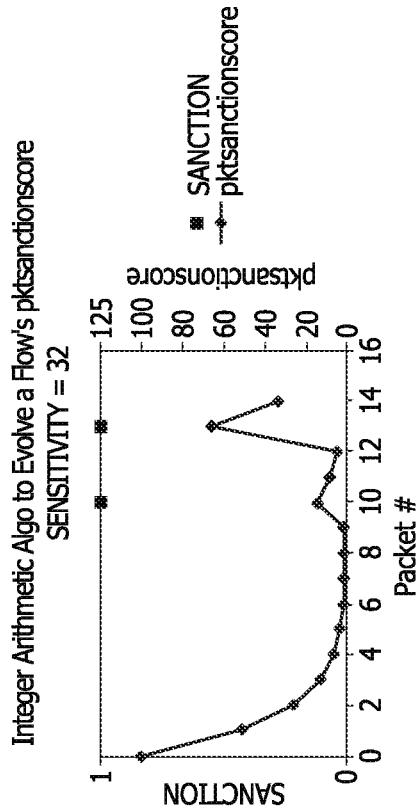
FIGS. 19A-19D illustrate a series of graphs of different algorithms used for whole-flow sanctions in accordance with at least one embodiment.
Figure 19A:
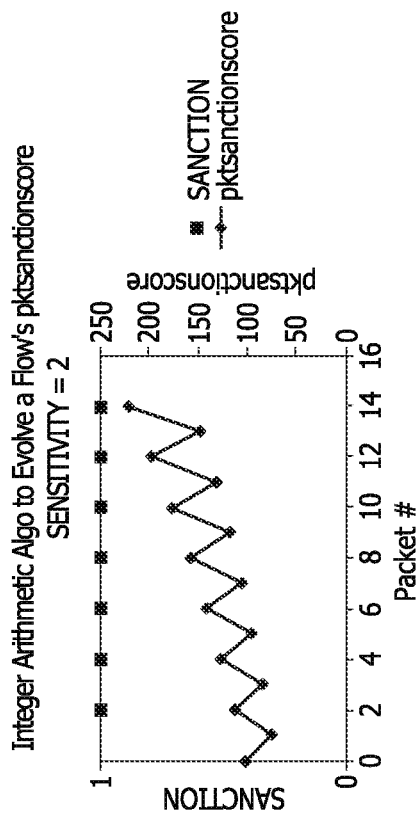
Figure 19D:
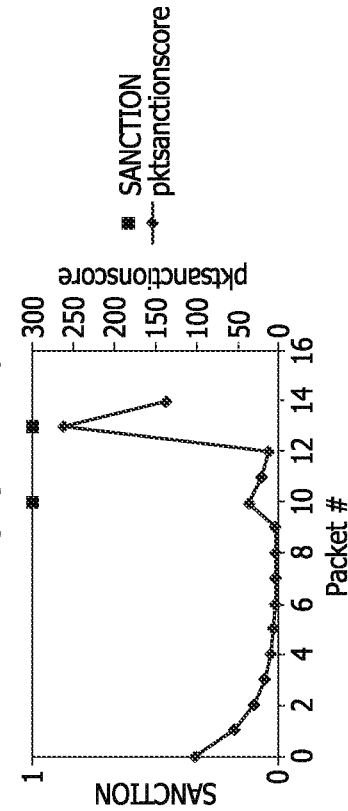
Figure 19C:
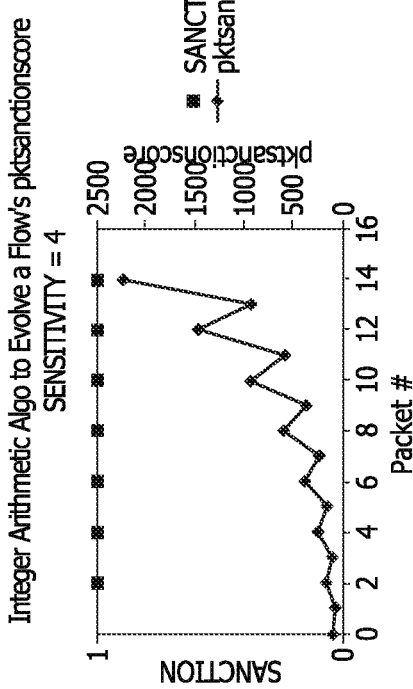

FIGS. 19A-19D illustrate a series of graphs of different algorithms used for whole-flow sanctions in accordance with at least one embodiment. FIG. 19A illustrates a pattern of alternating sanctions and forwards where the sensitivity is set at 2. FIG. 19B illustrates a pattern of sanctions at the tail of a burst where the sensitivity is set at 32. FIG. 19C illustrates a pattern of alternating sanctions and forwards where the sensitivity is set at 4. FIG. 19D illustrates a pattern of sanctions at the tail of a burst where the sensitivity is set at 64. In these algorithm, the operator may tweak the sensitivity. This could allow a run of good packets to build up credit and thus shelter subsequent sanctioned bad packet. Therefore it may be useful to set a floor to limit the credit.

Figure 20:
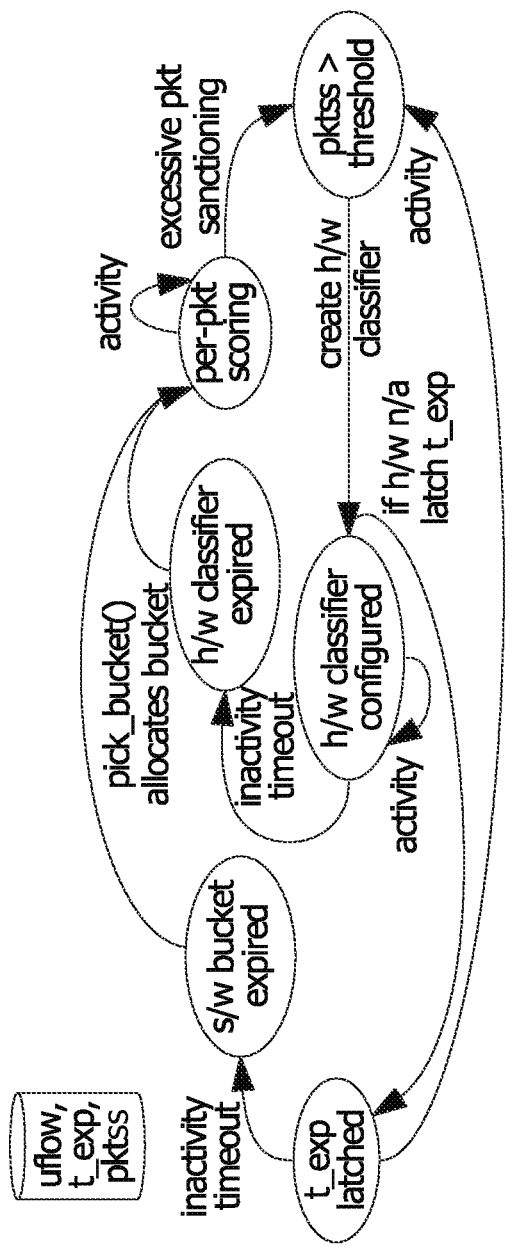
FIG. 20 illustrates an exemplary process for whole flow reclassification.

FIG. 20 illustrates an exemplary process for whole flow reclassification. Once the packet sanction score of a flow exceeds a threshold, the system 1000 reclassifies the whole flow as queue building. This may use a hardware classifier that provides an inactivity timeout. If the hardware is unavailable or exhausted, the system 1000 may turn the software bucket into a simple activity timer, latch up the expiry of the software bucket, and leave the packets unchanged. For subsequent packets, the system 1000 will skip the policy and scoring block and jump to the whole-flow block. The whole-flow block will retry adding in the hardware classifier or otherwise reinforce the latched software timer. In one example, the inactivity timeout is set to less than five minutes to keep from holding an inactive software bucket for a long period of time. In some embodiments, the whole-flows are similar to the microflows described above.

Figure 21:
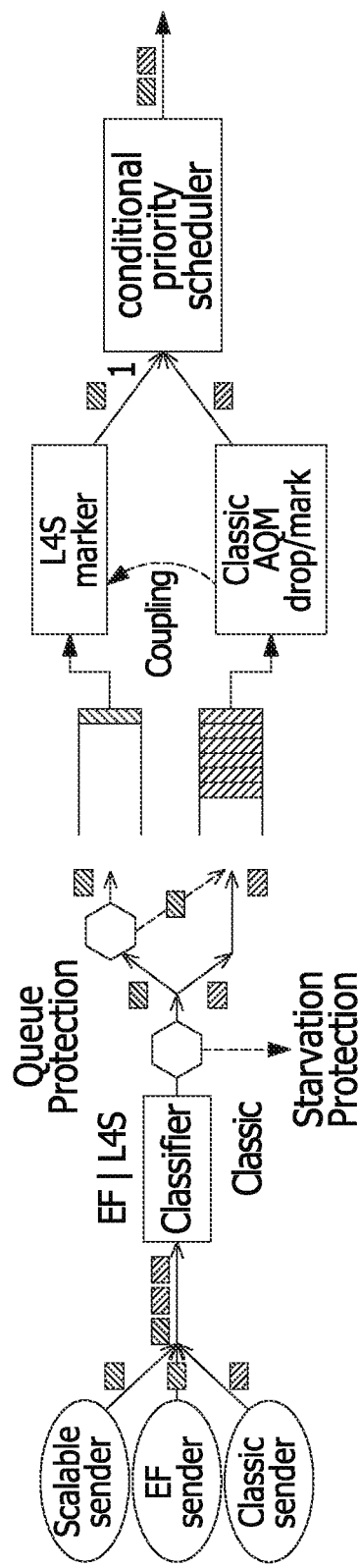
FIG. 21 illustrates a solution for routing packets between two queues with starvation protection.

FIG. 21 illustrates a solution for routing packets between two queues with starvation protection. Starvation protection controls the bandwidth sharing between the flows to ensure that all flows are not starved. This may be dependent on the number of flows. For the purposes of this discussion a starvation flowrate is less than 500 kb/s. If standard TCP flows are driven to below this mark, then no competing flow should have more than them. This allows for some flows to have more than others, as long as none of the flows are starving.

Figure 22:
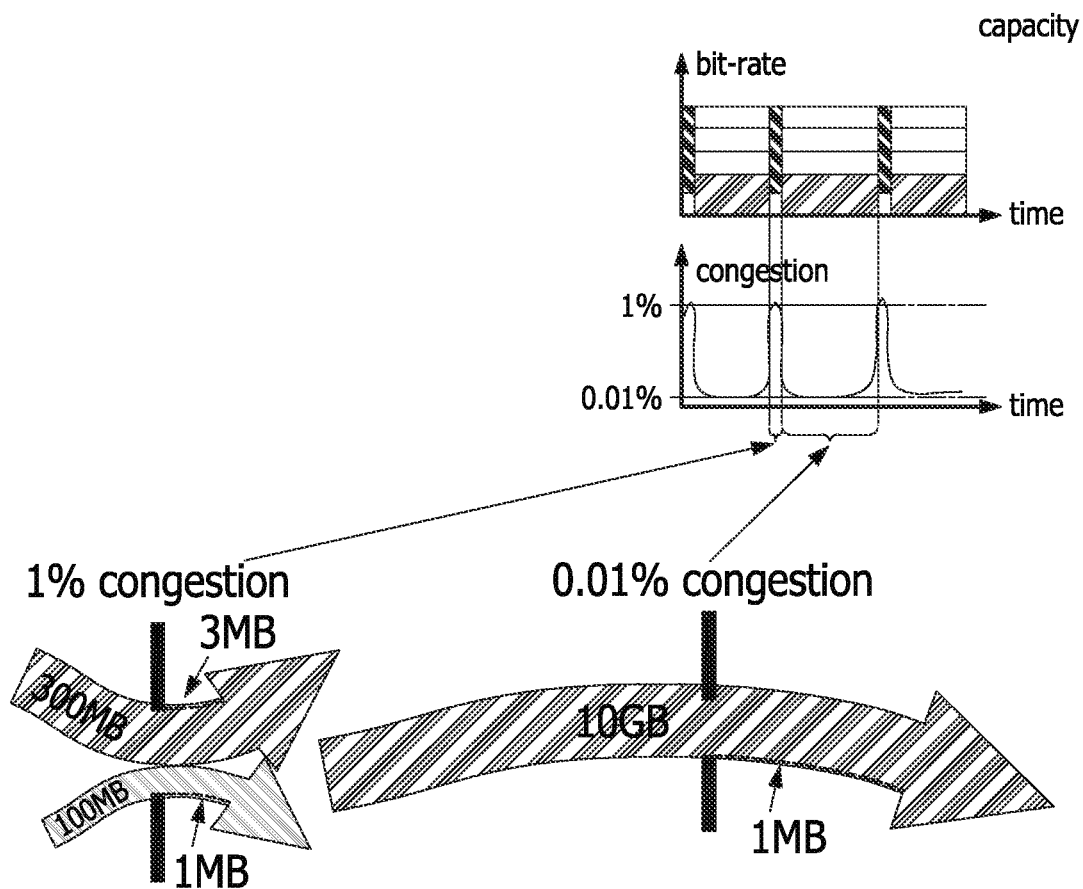
FIG. 22 illustrates how congestion may be measured over a period of time and affect the queue's starvation.

In this embodiment, the queuing score is used as the starvation blame metric. Bytes are weighted by congestion level as the sum over time ($p_L$*m). Sharp bursts of data may attract a high score, but this rapidly ages out. For long running flows, over time, the score becomes its share of capacity. FIG. 22 illustrates how congestion may be measured over a period of time and affect the queue's starvation.

Figure 23:
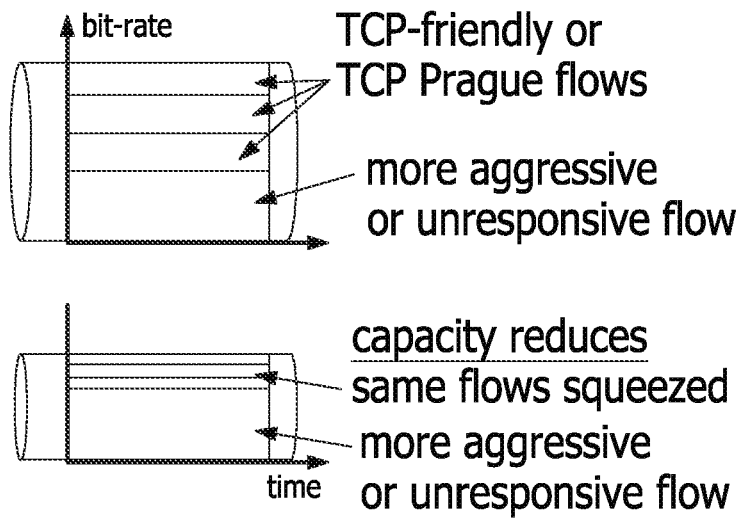
FIG. 23 illustrates TCP-friendly or TCP Prague flows as starvation indicator.
Figure 24:
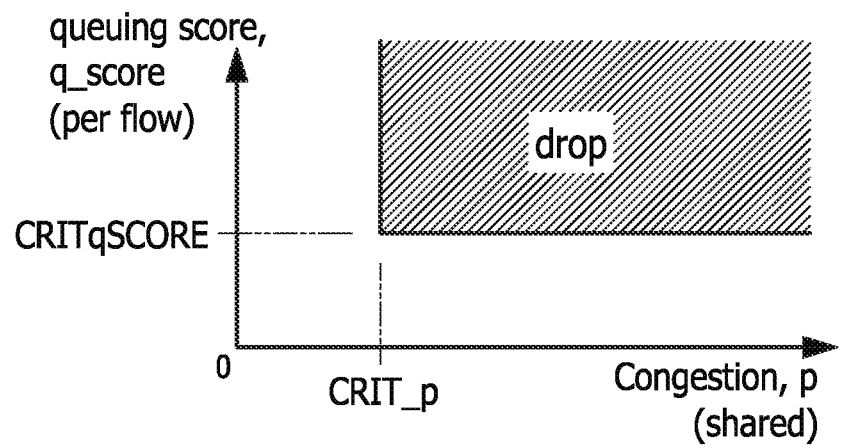
FIG. 24 illustrates a graph relating congestion to queuing score.

FIG. 23 illustrates TCP-friendly or TCP Prague flows as starvation indicator. TCP-friendly or TCP Prague flows follow the formula (flow rate $\propto 1/p_L$), which is the equivalent of the formula (flow rate $\propto 1/\sqrt{p_C}$). Therefore, due the squared coupling formula ($p_C \propto p_L^2$). Accordingly, a max congestion limit leads to a minimum TCP flow rate. FIG. 24 illustrates a graph relating congestion to queuing score.

Based on FIG. 24 packets are dropped if congestion exceeds a critical threshold and the queuing score exceeds another threshold.

Figure 25:
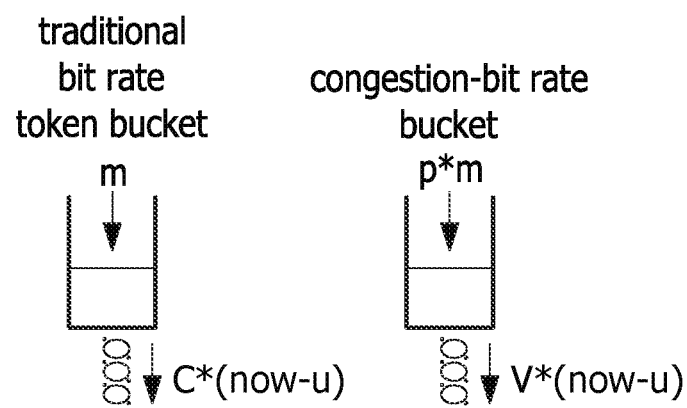
FIG. 25 illustrates a comparison of the traditional bit rate bucket and the congestion bit rate bucket.

FIG. 25 illustrates a comparison of the traditional bit rate bucket and the congestion bit rate bucket. The system 1000 accumulates congestion rate (p*m) per packet and ages at a constant congestion rate V. This may be accumulated per packet, similar to a token bucket. The token bucket rate meter accumulates the size of each packet (m) and ages it at the contracted bit rate (C), multiplying by C every time since the last updated u. The queuing score meter accumulates the size of each packet (m) scaled by congestion (p), and then aged by multiplying the congestion rate (V) by the time since the last updated u. The congestion (p) represents the current marking probability of the L queue, per the Queuing score described above. Combining these for each packet, the queuing score (aka bucket depth) comes out to Q_score+=p*m−V*(now−u).

Individual modems that support recent DOCSIS versions (e.g., D3.1) can be field-upgraded to implement the present systems and methods by way of a software update from the operator. Other modems may be upgraded by hardware modifications. Present systems and methods are advantageously applicable in cooperation with routers provided by either the operator or the customer. Accordingly, the techniques described herein are operable to reduce median latency for all traffic, but with no impact to TCP bulk data throughput. The present systems and methods require no additional configuration from the operator, but may flexibly be configured to provide operator control. The low latency DOCSIS techniques of the present embodiments are also applicable to LTE small cell backhaul in a DOCSIS environment Exemplary embodiments of systems and methods for low latency upstream traffic management and scheduling are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized with respect to downstream traffic, and in connection with other medication networks utilizing DOCSIS protocols or similarly compatible protocols.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A scheduling device for managing a packet queue of a communication gateway, comprising:
 a receiving portion configured to receive data packets according to at least one communication protocol;
 a processor; and
 a classification module configured to (i) classify individual packets of the received data packets as being one of latency-sensitive and latency-insensitive based on presence of a first indicator, (ii) associate each data packet of the received data packets with a flow of data including an associated flow classification indicator different from the first indicator, (iii) reclassify the received data packets based on the associated flow classification indicator in each packet, and (iv) separate the reclassified data packets into a first traffic queue and a second traffic queue separate from the first traffic queue,
 wherein the first traffic queue cooperates with a low latency service flow that is serviced with a first priority having a first scheduling weight,
 wherein the second traffic queue includes a primary service flow classified as having a second priority different from the first priority.

2. The scheduling device of claim 1, wherein the scheduling device is associated with one of an upstream and a downstream communication direction, and wherein a second scheduling device is associated with the other of the upstream and downstream communication direction.

3. The scheduling device of claim 2, wherein the scheduling device is associated with (i) a modem in the upstream communication direction, and (ii) a modem termination system in the downstream communication direction.

4. The scheduling device of claim 2, wherein the scheduling device is in communication with the second scheduling device.

5. The scheduling device of claim 1, wherein the first indicator includes at least one of a Differentiated Services Code Point (DSCP) code and an Explicit Congestion Notification (ECN).

6. The scheduling device of claim 1, wherein the classification module is further configured such that the first traffic queue implements a first active queue management (AQM)

on the low latency service flow and the second traffic queue implements a second active queue management (AQM) on the primary service flow.

7. The scheduling device of claim 6, wherein the first AQM and the second AQM are coupled to each other.

8. The scheduling device of claim 6, wherein the first AQM implements explicit congestion notification and wherein the second queue does not implement congestion notification.

9. The scheduling device of claim 1, wherein the low latency service flow is routed to a low latency communication channel, and wherein the primary service flow is routed to a primary communication channel separate from the low latency communication channel.

10. The scheduling device of claim 9, wherein a portion of the low latency service flow is routed to the primary communication channel.

11. The scheduling device of claim 9, wherein a portion of the low latency service flow comprises non-congesting traffic.

12. A scheduling device for managing a packet queue of a communication gateway, comprising:
a receiving portion configured to receive data packets according to at least one communication protocol;
a processor;
a classification module configured to separate the received data packets into a first traffic queue and a second traffic queue separate from the first traffic queue; and
wherein the first traffic queue cooperates with a low latency service flow that is serviced with a priority having a first scheduling weight,
wherein the second traffic queue includes a primary service flow classified as having a classic priority, and
wherein the classification module is further configured to separate the received data packets such that (i) data packets having a flow first indicator are sent to the first traffic queue, and (ii) data packets not having the first indicator are sent to the second traffic queue,
further comprising a queue protection function configured to (i) detect mismarked traffic and iii) route the mismarked traffic to the second traffic queue.

13. A method of scheduling incoming data traffic over a communication network by an electronic device of the communication network implementing at least one processor, comprising the steps of:
classifying packets of the incoming data traffic as being one of latency-sensitive and latency-insensitive based on presence of a first indicator;
associating each packet with a flow of data, wherein each flow of data includes a flow classification indicator;
reclassifying the packets based on the associated flow classification indicator; and
separating the reclassified packets into (i) a first traffic queue having priority having a first priority, and (ii) a second traffic queue having a second priority different from the first priority.

14. The method of claim 13 further comprising:
calculating a queuing score associated with each packet in the first traffic queue; and
calculating a delay of the first traffic queue.

15. The method of claim 14 further comprising associating the queuing score and the delay of the first traffic queue with the flow of data associated with the corresponding packet to generate a cumulative queuing score and a cumulative delay of the first traffic queue for the flow of data.

16. The method of claim 15 further comprising reclassifying the flow of data to be assigned to the second traffic queue if the cumulative queuing score exceeds a first threshold and the cumulative delay of the first traffic queue exceeds a second threshold.

17. The method of claim 15 further comprising aging the cumulative queuing score and the cumulative delay of the first traffic queue.

18. The method of claim 15, wherein the cumulative delay of the first traffic queue represents a corresponding flow of data's contribution to queueing in the first traffic queue.

19. The method of claim 14 wherein the queuing score represents an amount of time to clear the first traffic queue.

20. The method claim 13, wherein the electronic device comprises at least one of a cable modem and a cable modem termination system (CMTS).

21. A scheduling device for managing a packet queue of a communication gateway, comprising:
a receiving portion configured to receive data packets according to at least one communication protocol;
a processor;
a classification module configured to separate the received data packets into a first traffic queue and a second traffic queue separate from the first traffic queue; and
wherein the first traffic queue cooperates with a low latency service flow that is serviced with a priority having a first scheduling weight,
wherein the second traffic queue includes a primary service flow classified as having a classic priority,
wherein the classification module is further configured to separate the received data packets such that (i) data packets having a flow first indicator are sent to the first traffic queue, and (ii) data packets not having the first indicator are sent to the second traffic queue, and
wherein the classification module is further configured to separate the received data packets such that data packets having a second indicator are sent to the second traffic queue, wherein the second indicator is different than the first indicator.

22. A scheduling device for managing a packet queue of a communication gateway, comprising:
a receiving portion configured to receive data packets according to at least one communication protocol;
a processor; and
a classification module configured to separate the received data packets into a first traffic queue and a second traffic queue separate from the first traffic queue,
wherein the first traffic queue cooperates with a low latency service flow that is serviced with a priority having a first scheduling weight,
wherein the second traffic queue includes a primary service flow classified as having a classic priority,
wherein the classification module is further configured to separate the received data packets such that (i) data packets having a flow first indicator are sent to the first traffic queue, and (ii) data packets not having the first indicator are sent to the second traffic queue, and
wherein the first indicator includes at least one of a Differentiated Services field and an Explicit Congestion Notification field.

* * * * *